United States Patent
Hammoud

(10) Patent No.: US 11,731,657 B2
(45) Date of Patent: Aug. 22, 2023

(54) MALICIOUS EVENT DETECTION FOR AUTONOMOUS VEHICLES

(71) Applicant: TuSimple, Inc., San Diego, CA (US)

(72) Inventor: Riad I. Hammoud, San Diego, CA (US)

(73) Assignee: TUSIMPLE, INC., San Diego, CA (US)

(*) Notice: Subject to any disclaimer, the term of this patent is extended or adjusted under 35 U.S.C. 154(b) by 179 days.

(21) Appl. No.: 17/165,396

(22) Filed: Feb. 2, 2021

(65) Prior Publication Data

US 2022/0242451 A1 Aug. 4, 2022

(51) Int. Cl.
*G05D 1/02* (2020.01)
*G07C 5/08* (2006.01)
(Continued)

(52) U.S. Cl.
CPC ....... *B60W 60/0016* (2020.02); *B60R 25/102* (2013.01); *B60R 25/104* (2013.01);
(Continued)

(58) Field of Classification Search
CPC ......... B60W 60/0016; B60W 2554/20; B60W 2554/4029; B60W 2556/45; B60W 2300/14; B60W 2420/40; B60W 2420/42; B60W 2420/52; B60W 2510/06; B60W 2510/10; B60R 25/102; B60R 25/104; G05D 1/0214; G05D 1/0231; G05D 1/0242; G05D 1/0276; G07C 5/0808; H04L 67/12; H04L 67/141
See application file for complete search history.

(56) References Cited

U.S. PATENT DOCUMENTS

2012/0246109 A1* 9/2012 Lahiri ................. G06F 11/0754
706/58
2016/0161831 A1* 6/2016 Samardzic ............. B60R 11/04
396/428

(Continued)

FOREIGN PATENT DOCUMENTS

WO 2020012283 A1 1/2020

OTHER PUBLICATIONS

European Patent Office Communication regarding extended EP Search Report on Application No. 22154444.8-1213, dated Jun. 13, 2022.

*Primary Examiner* — Anne Marie Antonucci
*Assistant Examiner* — Jingli Wang
(74) *Attorney, Agent, or Firm* — Paul Liu; Glenn Theodore Mathews; Baker Botts LLP

(57) ABSTRACT

A system comprises an autonomous vehicle (AV) and a control device operably coupled with the AV. The control device detects a series of events within a threshold period of time, where a number of series of events in the series of events is above a threshold number. The series of events taken in the aggregate within the threshold period of time deviates from a normalcy mode. The normalcy mode comprises events that are expected to the encountered by the AV. The control device determines whether the series of events corresponds to a malicious event, where the malicious event indicates tampering with the AV. In response to determining that the series of events corresponds to the malicious event, the series of events are escalated to be addressed.

20 Claims, 5 Drawing Sheets

(51) Int. Cl.
  *B60W 60/00*   (2020.01)
  *B60R 25/102*   (2013.01)
  *B60R 25/104*   (2013.01)
  *H04L 67/12*   (2022.01)
  *H04L 67/141*   (2022.01)

(52) U.S. Cl.
  CPC ......... *G05D 1/0214* (2013.01); *G05D 1/0231* (2013.01); *G05D 1/0242* (2013.01); *G05D 1/0276* (2013.01); *G07C 5/0808* (2013.01); *H04L 67/12* (2013.01); *H04L 67/141* (2013.01); *B60W 2300/14* (2013.01); *B60W 2420/40* (2013.01); *B60W 2420/42* (2013.01); *B60W 2420/52* (2013.01); *B60W 2510/06* (2013.01); *B60W 2510/10* (2013.01); *B60W 2554/20* (2020.02); *B60W 2554/4029* (2020.02); *B60W 2556/45* (2020.02)

(56) References Cited

U.S. PATENT DOCUMENTS

| | | | |
|---|---|---|---|
| 2019/0009785 A1* | 1/2019 | Lawrenson | G01S 17/66 |
| 2019/0019416 A1* | 1/2019 | Perko | G05D 1/0088 |
| 2019/0191311 A1* | 6/2019 | O'Brien | G01C 21/20 |
| 2019/0235515 A1* | 8/2019 | Shirvani | G06K 9/6271 |
| 2019/0381964 A1* | 12/2019 | Halford | G08B 25/016 |
| 2020/0139932 A1 | 5/2020 | Wood et al. | |
| 2021/0170989 A1* | 6/2021 | Cameron | B60R 25/1004 |

\* cited by examiner

MALICIOUS EVENT DETECTION FOR AUTONOMOUS VEHICLES

TECHNICAL FIELD

The present disclosure relates generally to autonomous vehicles. More particularly, the present disclosure is related to malicious event detection for autonomous vehicles.

BACKGROUND

One aim of autonomous vehicle technologies is to provide vehicles that can safely navigate towards a destination. In some cases, an autonomous vehicle may encounter an unexpected situation on its way to a destination. For example, an autonomous vehicle may encounter a situation where a third party, such as a vehicle, an individual, or a pedestrian attempts to tamper with the AV. For example, a third party may attempt to force the autonomous vehicle to deviate from its predetermined traveling path or force the autonomous vehicle to pull over. Current autonomous vehicle technologies may not be configured to account for encountering specific unexpected situations.

SUMMARY

This disclosure recognizes various problems and previously unmet needs related to detecting malicious events affecting autonomous vehicles. Current autonomous vehicle technologies may not be configured to account for malicious intents of vehicles, individuals, or pedestrians attempting to tamper with an autonomous vehicle (AV). For instance, one or more vehicles may intentionally force the AV to deviate from its routing plan or traveling path by invading space within a threshold distance from the AV. As for another instance, one or more vehicles may intentionally force the AV to pull over. As for another instance, one or more vehicles may intentionally force the AV to slow down. The one or more vehicles causing the above-identified events may attempt to access or steal cargo carried by the AV, or devices and autonomous technology present in the AV. As for another instance, one or more vehicles may intentionally or inadvertently collide with the AV and flee the scene of the accident.

Certain embodiments of this disclosure provide unique technical solutions to technical problems of current autonomous vehicle technologies, including those problems described above by detecting a series of events within a threshold period, where the series of events corresponds to a malicious event. For example, the detected series of events may indicate a deviation from a normalcy mode, where the normalcy mode comprises expected or predictable scenarios in various road environments.

The various road environments may comprise, for example, when the AV is in traffic. In this example, it is expected that sensors of the AV detect that all surrounding vehicles in the traffic are stopped or slowing down. As such, if the sensors detect that one or more surrounding vehicles are slowing down, while other vehicles are not slowing down, the AV may determine that this situation is a deviation from the normalcy mode. Another example of a road environment in the normalcy mode may be when the AV is driving along a road. In this example, it is expected that the sensors of the AV detect that 1) vehicles driving next to the AV do not drive parallel to the AV for more than a threshold period and 2) the vehicles driving next to the AV do not invade a threshold distance from the AV for more than a threshold period.

Upon detecting a series of events that deviates from the normalcy mode, the series of events is escalated to be addressed. For example, a communication path may be established with the AV such that a remote operator can be seen and/or heard from a communication module at the AV in order to discourage individuals tampering with the AV from tampering with the AV. As another example, a notifying message may be sent to law enforcement indicating that the AV is being tampered with at a particular location coordinate.

In one embodiment, a system comprises an AV that comprises at least one vehicle sensor, where the AV is configured to travel along a road. The system further comprises a control device that is operably coupled with the AV. The control device detects, from sensor data received from the vehicle sensor, a series of events within a threshold period, where a number of events in the series of events is above a threshold number. The series of events in the aggregate within the threshold period deviates from a normalcy mode. The normalcy mode comprises events that are expected to the encountered by the AV. The control device determines whether the series of events corresponds to a malicious. In response to determining that the series of events corresponds to the malicious event, the control device escalates the series of events to be addressed, where escalating the series of events comprises performing at least one countermeasure to resolve the series of events. At least one countermeasure comprises establishing a communication path between the AV and an operator such that the operator is able to converse with accomplices causing the series of events.

The disclosed systems provide several practical applications and technical advantages which include: 1) technology that builds a normalcy mode, where the normalcy mode comprises expected or predictable scenarios in various road environments; 2) technology that detects a series of events in a threshold period and determines whether the series of events deviates from the normalcy mode, where the series of events is greater than a threshold number of events; 3) technology that establishes a communication path with the AV, in response to determining that the series of events corresponds to a malicious event, where the communication path supports voice and visual communications; 4) technology that sends a notifying message to law enforcement indicating that the AV is being tampered with at a particular location coordinate, in response to determining that the series of events corresponds to a malicious event; 5) technology that remotely activates a horn of the AV, in response to determining that the series of events corresponds to a malicious event; and 7) technology that activates a surveillance sensor to record the series of events, in response to determining that the series of events corresponds to a malicious event, where the surveillance sensor is hidden from sight.

As such, the systems described in this disclosure may be integrated into a practical application of determining a more efficient, safe, and reliable solution for detecting malicious events acted upon the AV. For example, the disclosed system may determine that a series of events detected within a threshold period deviates from the normalcy mode. The disclosed system may compare the detected series of events with the normalcy mode. If a corresponding expected scenario is found, the disclosed system determines that the series of events (in aggregation) does not correspond to a malicious event. If, however, no corresponding expected scenario is found, the disclosed system determines that the series of events (in aggregation) corresponds to a malicious event. In another example, the disclosed system may determine that above a threshold number of events from the series of events detected within the threshold period of time deviate from the normalcy mode. In another example, the disclosed system may compare each event from the series of events with the expected scenarios to determine whether each event corresponds to an expected scenario.

Furthermore, the systems described in this disclosure may be integrated into an additional practical application of determining a more efficient, safe, and reliable solution to address and perhaps resolve a situation where a third party is tampering with the AV. For example, the disclosed system may establish a communication path with the AV, and enable a remote operator to be seen and/or heard from a communication module at the AV in order to discourage individuals tampering with the AV from tampering with the AV. As another example, the disclosed system may remotely activate a horn of the AV in order to discourage individuals tampering with the AV from tampering with the AV. As for another example, the disclosed system may send a notifying message to law enforcement indicating that the AV is being tampered with at a particular location coordinate.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
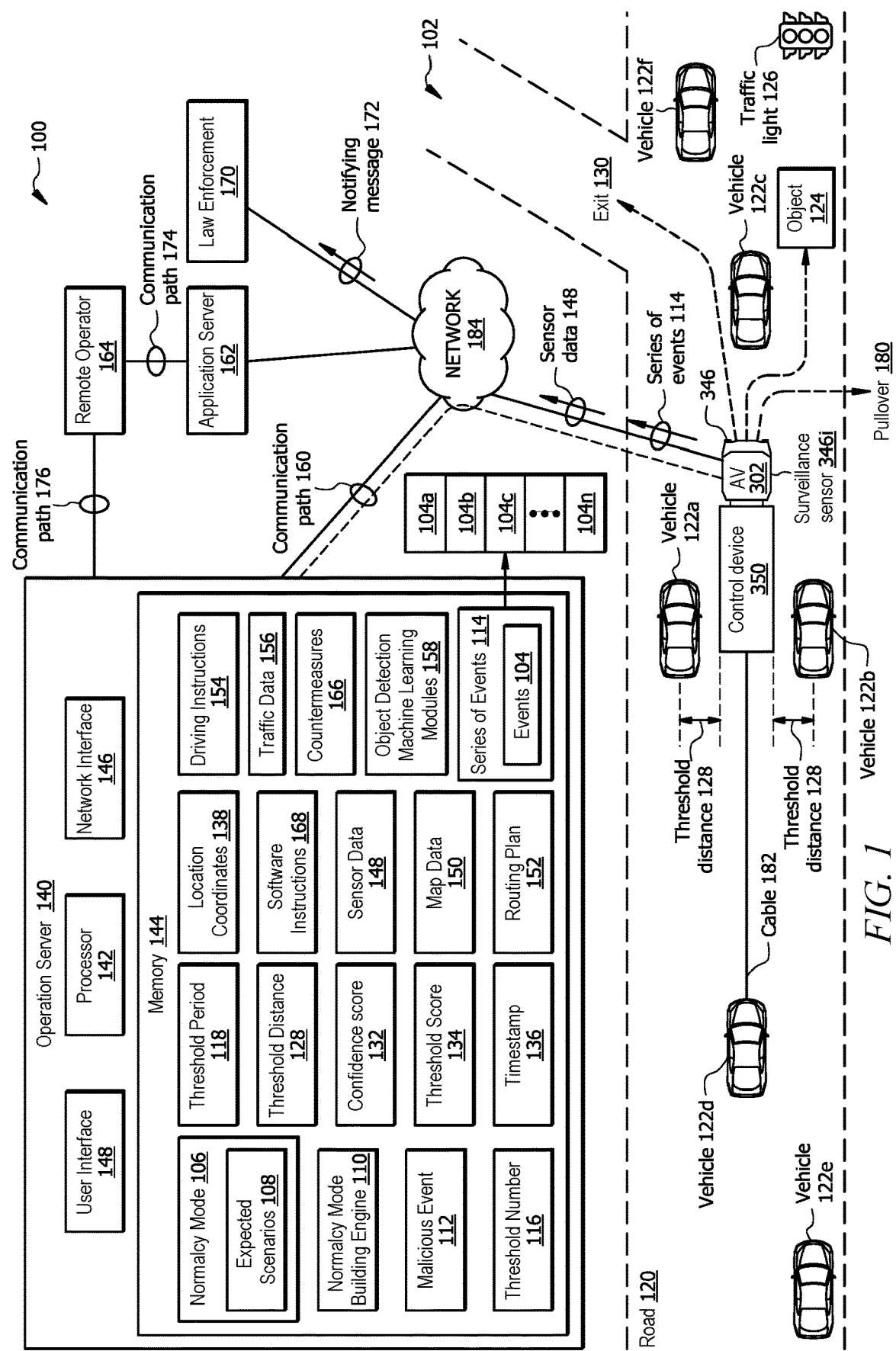
FIG. 1 illustrates an embodiment of a system configured to detect malicious events for an autonomous vehicle (AV) and a simplified schematic diagram of example series of events corresponding to malicious events according to certain embodiments of this disclosure.
Figure 2:
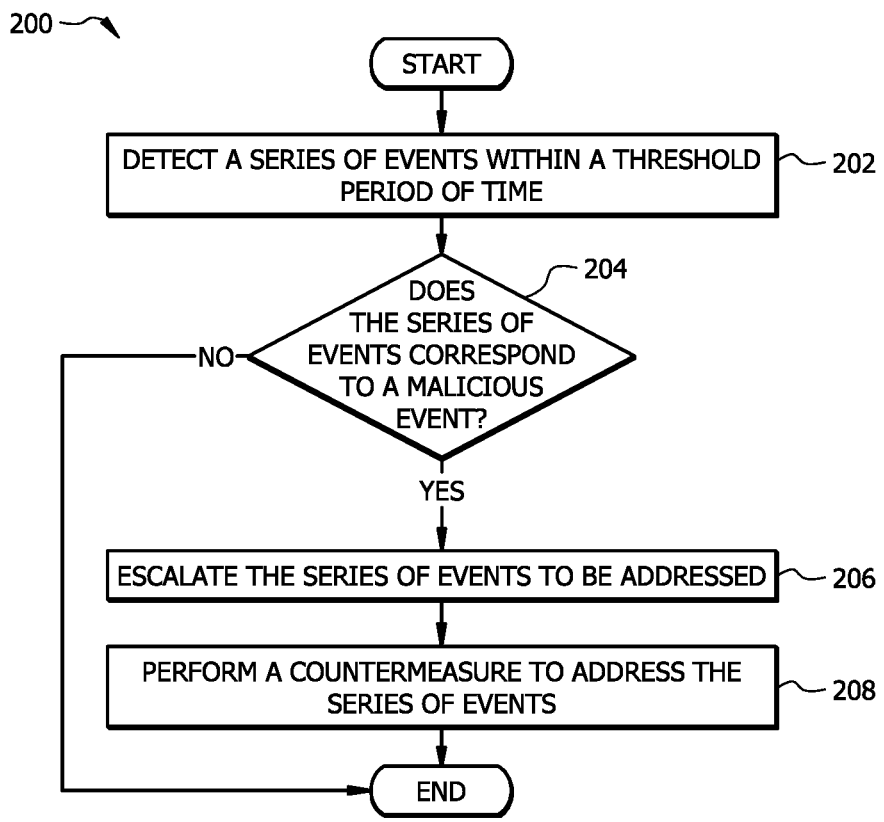
FIG. 2 illustrates an example flowchart of a method for detecting malicious events for an AV.
Figure 3:
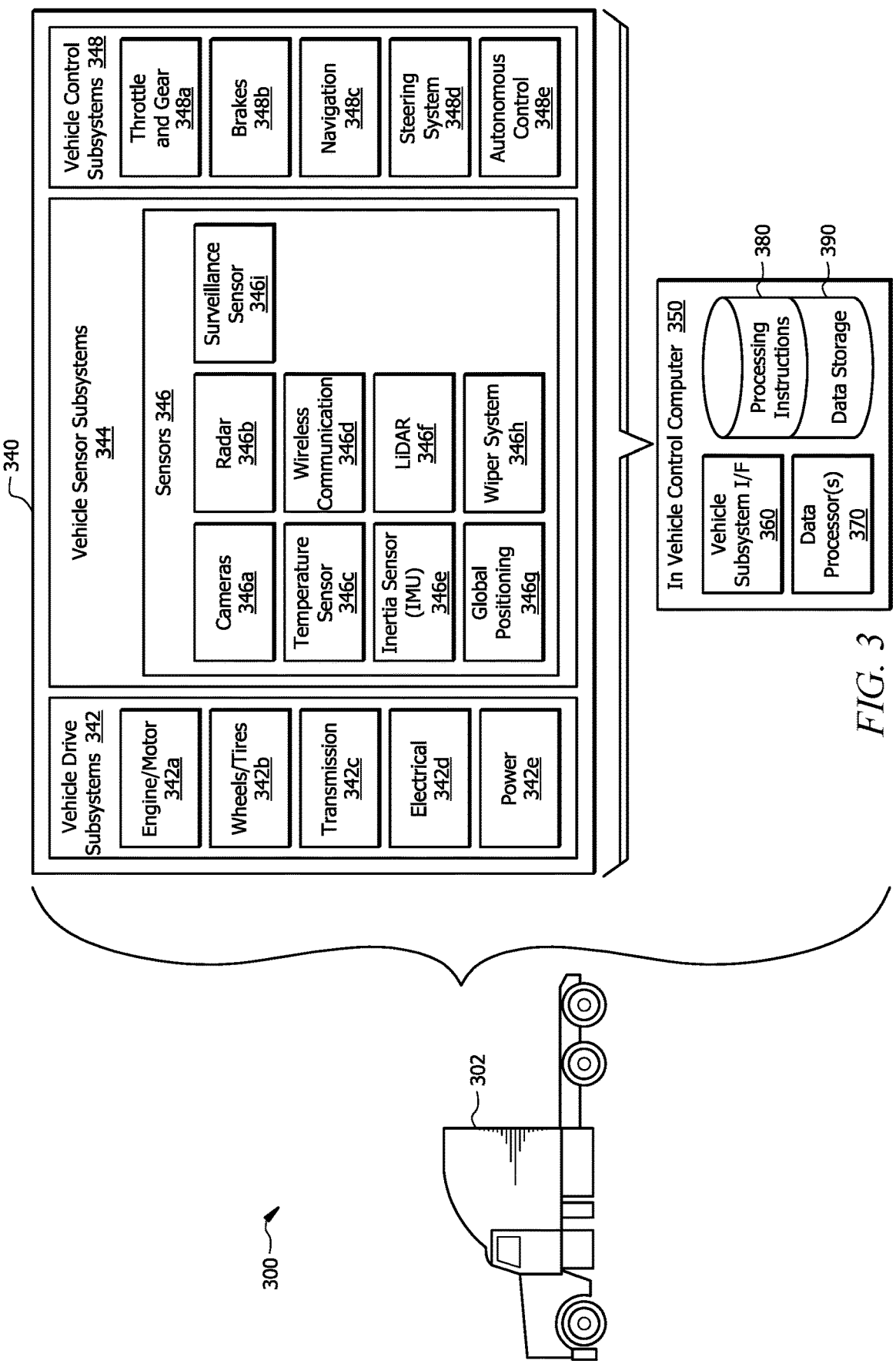
FIG. 3 illustrates a block diagram of an example AV configured to implement autonomous driving operations.
Figure 4:
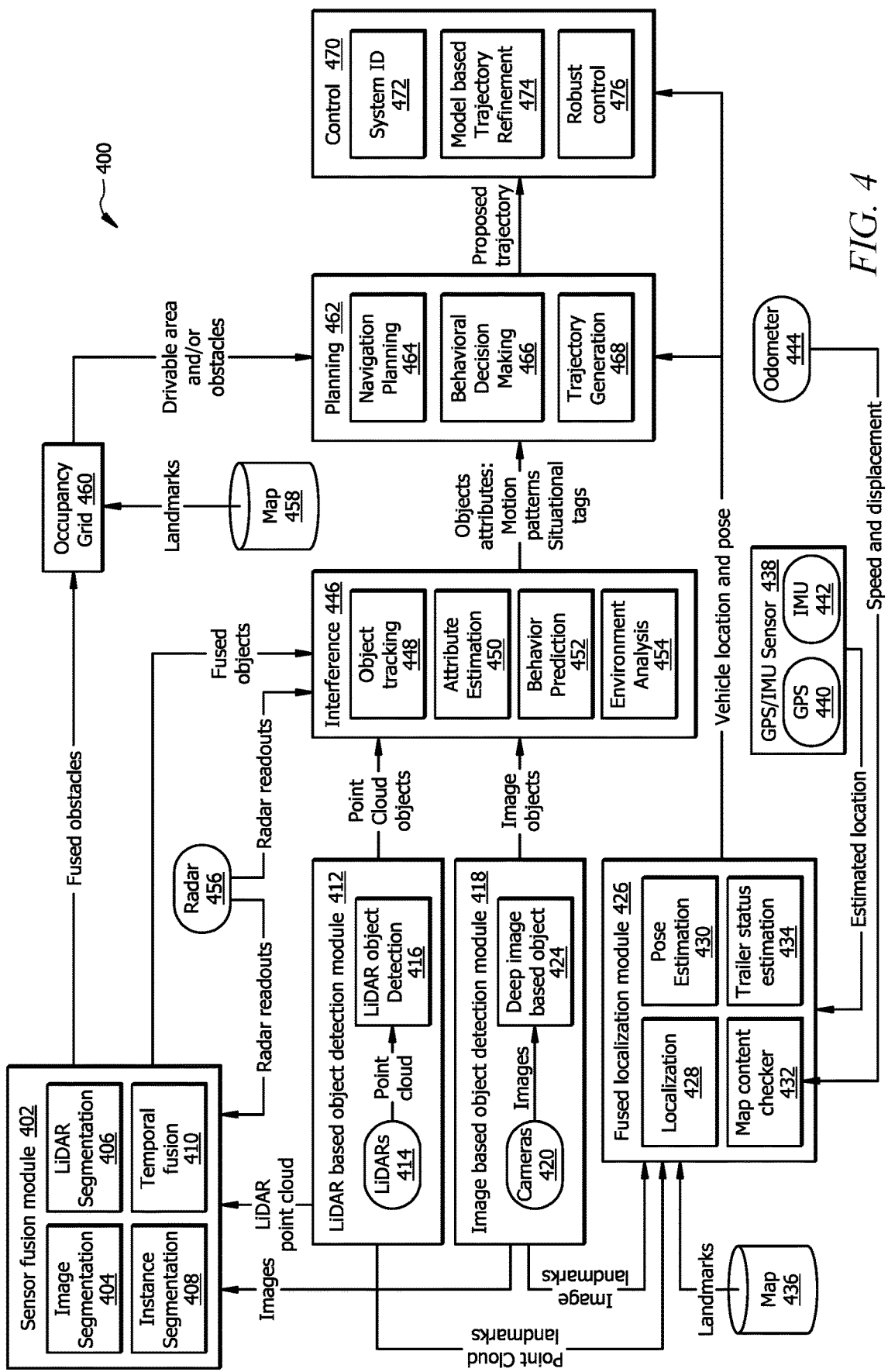
FIG. 4 illustrates an example system for providing autonomous driving operations used by the AV of FIG. 3.
Figure 5:
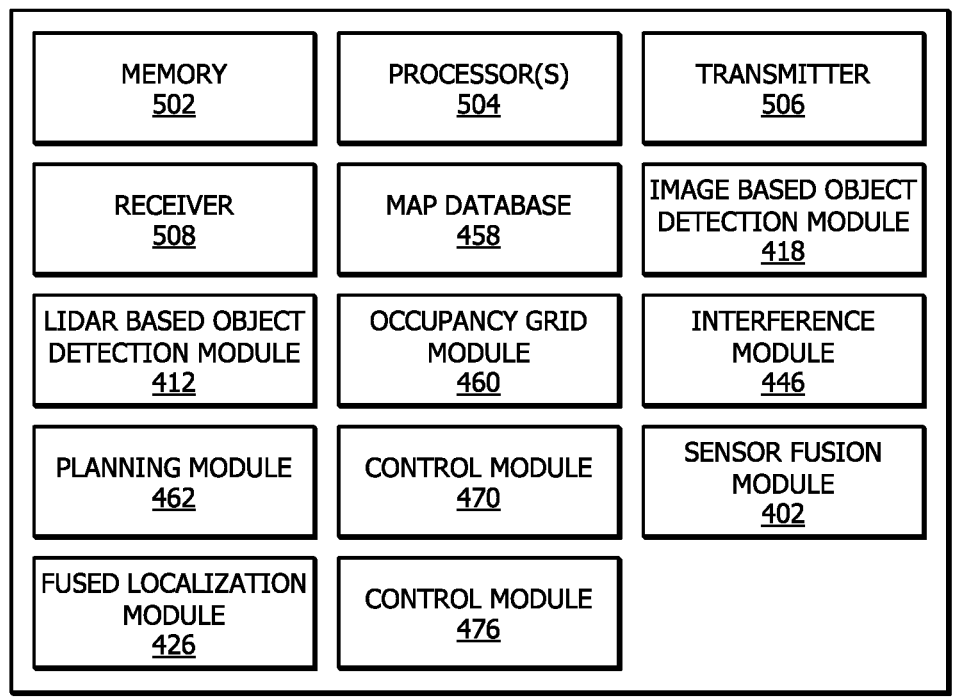
FIG. 5 illustrates a block diagram of an in-vehicle control computer included in the AV of FIG. 3.

As described above, previous technologies may fail to provide efficient, reliable, and safe solutions for detecting malicious events for autonomous vehicles. This disclosure provides various systems, methods, and devices for 1) improving the performance of a traveling AV; 2) providing a safe driving experience for the AV, other vehicles, and pedestrians; and 3) securing a cargo carried by the AV by detecting a series of events that corresponds to a malicious event, escalating the malicious event to be addressed, and carrying out countermeasures to address (and perhaps resolve) the malicious event. FIG. 1 illustrates an embodiment of a system that is configured to detect malicious events encountered by an AV. FIG. 1 further illustrates the AV traveling along a road where various examples of anomalous series of events occur that each corresponds to a malicious event individually or that, in the aggregate, correspond to a malicious event. FIG. 2 illustrates an example flowchart of an embodiment of a method for detecting malicious events for an AV. FIGS. 3-5 illustrate an example AV and various systems and devices for implementing autonomous driving operations by an AV, including the malicious event detection operation described in this disclosure. For example, FIG. 5 illustrates an example control device of the example AV shown in FIG. 3 for implementing the malicious event detection operations described in this disclosure.

Example System for Detecting Malicious Events for an AV

FIG. 1 illustrates an embodiment of a system 100 for detecting malicious events 112 for an AV 302. FIG. 1 further illustrates a simplified schematic diagram 102 that comprises various examples of anomalous road conditions or series of events 114 that correspond to tampering with an AV 302. In one embodiment, system 100 comprises the AV 302 and an operation server 140. The system 100 may further comprise an application server 162, a remote operator 164, and a network 184 that provides communication paths for all of the illustrated components of the system 100 to communicate with each other. The system 100 may be configured as shown or any other suitable configurations.

In general, the system 100 detects a series of events 114 that may correspond to a malicious event 112, where the malicious event 112 indicates that a third party, such as a vehicle 122 or a pedestrian is tampering with the AV 302. The series of events 114 comprises a number of events above a threshold number 116 that occur within a threshold period of time 118. For example, the series of events 114 may comprise a first event 104a and a second event 104b that in the aggregate taken within a threshold period of time 118 amount to the series of events 114 that deviates from a normalcy mode 106. Although this disclosure is detailed with respect to a series of events 114 that includes more than one event 104 that in the aggregate deviate from a normalcy mode 106, it should be understood that system 100 also contemplates identifying and escalating a singular event 104 that deviates from a normalcy mode 106 as a malicious event 112 in the same or similar manner to how a series of events 114 is identified and escalated as a malicious event 112. Normalcy mode 106 is described in detail further below. In brief, the normalcy mode 106 comprises events or scenarios 108 that are expected to be encountered by the AV 302 in the normal course of operation. System 100 may detect the series of events 114 from sensor data 178 received from sensors 346 associated with the AV 302. Upon detecting the series of events 114 within the threshold period 118, system 100 determines whether the series of events 114 corresponds to a malicious event 112. In response to determining that the series of events 114 corresponds to a malicious event 112, system 100 escalates the series of events 114 to be addressed. For example, the control device 350 communicates the series of events 114 to the operation server 140 to be addressed by a remote operator 164. The various examples of an anomalous series of events 114 are described in detail further below. The corresponding description below comprises a brief description of certain components of the system 100.

System Components

In one embodiment, the AV 302 may include a semi-truck tractor unit attached to a trailer to transport cargo or freight from one location to another location (see FIG. 3). In this disclosure, the semi-truck tractor may be referred to as a cab of the AV 302. The AV 302 is navigated by a plurality of components described in detail in FIGS. 3-5. The operation of the AV 302 is described in greater detail in FIG. 3. The corresponding description below includes brief descriptions of certain components of the AV 302. In brief, the AV 302 includes a in-vehicle control computer 350 which is operated to facilitate autonomous driving of the AV 302. In this disclosure, the in-vehicle control computer 350 may be interchangeably referred to as a control device 350.

Control device 350 is generally configured to control the operation of the AV 302 and its components. The control device 350 is further configured to determine a pathway in front of the AV 302 that is safe to travel and free of objects/obstacles, and navigate the AV 302 to travel in that pathway. This process is described in more detail in FIGS. 3-5.

The control device 350 generally includes one or more computing devices in signal communication with other components of the AV 302 (see FIG. 3). The control device 350 receives sensor data 178 from one or more sensors 346 positioned on the AV 302 to determine a safe pathway to travel. The sensor data 178 includes data captured by the sensors 346. Sensors 346 are configured to capture any object within their detection zones or fields of view, such as landmarks, lane markings, lane boundaries, road 120 boundaries, vehicles 122, pedestrians, road 120/traffic signs, among other objects. The sensors 346 may include cameras, LiDAR sensors, motion sensors, infrared sensors, and the like. In one embodiment, the sensors 346 may be positioned around the AV 302 to capture the environment surrounding the AV 302. In some cases, the sensors 346 may detect a series of events 114 within the threshold period 118 that corresponds to a malicious event 112. For example, the sensor data 178 may include one or more indications indicating anomalous or abnormal series of events 114 within the threshold period of time 118. The threshold period of time 118 may be determined to be thirty seconds, one minute, two minutes, or any other appropriate duration.

The control device 350 analyzes the sensor data 178 and determines whether the series of events 114 corresponds to a malicious event 112. For example, the control device 350 may compare the series of events 114 with the normalcy mode 106 to determine whether the series of events 114 corresponds to any of the expected scenarios 108.

In one embodiment, the control device 350 may compare each event 104 from the series of events 114 individually with the normalcy mode 106 (or each of the expected scenarios 108). For example, if above the threshold number 116 of events 104 are detected within the threshold period of time 118 such that each of those events 104 does not correspond to the normalcy mode 106, the control device 350 may determine that those events 104 in the aggregate indicate a deviation from the normalcy mode 106, and correspond to a malicious event 112.

In one embodiment, the control device 350 may compare the series of events 114, as a whole, with the normalcy mode 106 (or the expected scenarios 108). For example, if the series of events 114, taken as a whole, does not correspond to any of the expected scenarios 108, the control device 350 may determine that the series of events 114 is a deviation from the normalcy mode 106, and correspond to a malicious event 112. In other words, if a corresponding expected scenario 108 is found, the control device 350 determines that the series of events 114, as a whole, does not correspond to a malicious event 112. If, however, the series of events 114 does not correspond to any of the expected scenarios 108, the control device 350 determines that the series of events 114 corresponds to the malicious event 112.

The control device 350 is in signal communication with the operation server 140. The control device 350 is configured to communicate the sensor data 178 to the operation server 140, for example, via network 184. The control device 350 may communicate the sensor data 178 to the operation server 140 periodically (e.g., every minute, every few minutes, or any other suitable interval), continuously, and/or upon receiving a request from the operation server 140 to send sensor data 178. The sensor data 178 may include data describing the environment surrounding the AV 302, such as image feed, video feed, LiDAR data feed, and other data captured from the fields of view of the sensors 346. The sensor data 178 may further include location coordinates 138 associated with the AV 302. See the corresponding description of FIG. 3 for further description of the control device 350.

Operation server 140 is generally configured to oversee the operations of the AV 302. Details of the operation server 140 are described further below. In brief, the operation server 140 comprises a processor 142, a memory 144, a network interface 146, and a user interface 148. The components of the operation server 140 are operably coupled to each other.

The processor 142 may include one or more processing units that perform various functions as described herein. The memory 144 stores any data and/or instructions used by the processor 142 to perform its functions. For example, the memory 144 stores software instructions 168 that when executed by the processor 142 causes the operation server 140 to perform one or more functions described herein.

The operation server 140 is in signal communication with the AV 302 and its components. The operation server 140 is configured to receive the sensor data 178 and the series of events 114 from the control device 350, analyze them, and, in response, confirm (or update) the determination of the control device 350 regarding whether the series of events 114 corresponds to a malicious event 112.

The operation server 140 is further configured to detect objects on and around a road 120 traveled by the AV 302 by analyzing the sensor data 178. For example, the operation server 140 may detect objects on and around a road 120 by implementing object detection machine learning modules 158. The object detection machine learning modules 158 may be implemented using neural networks and/or machine learning algorithms for detecting objects from images, videos, infrared images, point clouds, radar data, etc. The object detection machine learning modules 158 is described in more detail further below.

Normalcy Mode

Normalcy mode 106 generally comprises scenarios 108 that are expected to be encountered by the AV 302. The normalcy mode 106 is built or generated by a normalcy mode building engine 110. The normalcy mode building engine 110 is described further below. For example, the normalcy mode 106 may be built by the processor 142 executing the software instructions 168.

The normalcy mode 106 generally corresponds to expected or predictable scenarios 108 that indicate 1) expected actions or behaviors of the AV 302 and 2) expected actions or behaviors of objects within and outside detection zones of the sensors 346, including moving objects (such as vehicles 122, pedestrians, etc.) and static objects (such as traffic lights 126, etc.) in various situations. For example, the normalcy mode 106 may include expected scenarios 108 in situations where the AV 302 is in traffic, behind a traffic light 126, detected an impact or collision with a vehicle 122 or an object 124, among other situations which are described below.

As an example, a first expected scenario 108 in the normalcy mode 106 may indicate that when the AV 302 is in congested traffic or behind a traffic light 126, it is expected that vehicles 122 surrounding the AV 302 to slow down or have stopped. Thus, in scenarios where the sensors 346 detect that particular vehicles 122 surrounding the AV 302 are slowing down and there is no traffic light 126 or traffic detected by the sensors 346, the control device 350 determines that this situation may be a deviation from the normalcy mode 106. The control device 350 may determine that there is no traffic by detecting that other vehicles 122 (for example, vehicles 122e and 122f) are not slowing down, where vehicles 122 that are not slowing down may be in the same lane or a different lane than a lane traveled by the AV 302. The control device 350 may also determine that there is no traffic ahead of the AV 302 from traffic data 156, for example, from live traffic reporting, etc.

In a particular example, a deviation from the first expected scenario 108 in the normalcy mode 106 may comprise indications indicating that multiple vehicles 122 around the AV 302 are slowing down (e.g., vehicles 122a-b, vehicles 122a-c, or vehicles 122a-d) and attempting to force the AV 302 to slow down, while there is no traffic or traffic light 126 detected by the sensors 346. In other words, the multiple vehicles 122 around the AV 302 are impeding the progress of the AV 302 to "box-in" the AV 302. In this way, the vehicles 122 may force the AV 302 to slow down, pull over, or deviate from its routing plan 152. Thus, in situations where the sensors 346 detect that vehicles 122 surrounding the AV 302 are slowing down, while there is no traffic or traffic light 126 detected by the sensors 346, the control device 350 may determine that such situations correspond to an event 104 or a series of events 114 that deviates from the normalcy mode 106.

As another example, a second expected scenario 108 in the normalcy mode 106 may indicate that a distance of a vehicle 122 from the AV 302 is expected to be above a threshold distance 128, and if the distance of that vehicle 122 from the AV 302 becomes less than the threshold distance 128, it is expected that that vehicle 122 does not persist on staying with a distance less than the threshold distance 128 from the AV 302 for more than a threshold period of time 118. In a particular example, a deviation from the second expected scenario 108 in the normalcy mode 106 may comprise indications indicating that one or more vehicles 122 are persisting on staying with a distance less than the threshold distance 128 from the AV 302 for more than the threshold period of time 118 (e.g., thirty seconds, one minute, two minutes, or any other appropriate duration). Thus, in situations where the sensors 346 detect that one or more vehicles 122 stay with a distance less than the threshold distance 128 from the AV 302 for more than the threshold period 118, the control device 350 may determine that such situations correspond to an event 104 or a series of events 114 that deviates from the normalcy mode 106.

As another example, a third expected scenario 108 in the normalcy mode 106 may indicate that the AV 302 is expected to drive within a particular speed range provided by the driving instructions 154 according to a speed limit of the road 120 traveled by the AV 302. Thus, in situations where a vehicle drive subsystem 342 (see FIG. 3) monitoring an engine 342a of the AV 302 (see FIG. 3) detects that the speed of the engine 342a is going out of the particular speed range, while components of the vehicle control subsystems 348 (see FIG. 3) are operating according to instructions provided in the driving instructions 154, the control device 350 may determine that this situation is a deviation from the normalcy mode 106. In a particular example, this situation may occur if a vehicle 112d drags the AV 302 back by a cable 182, or otherwise impedes the progress of the AV 302. Thus, the control device 350 determines that such situations may correspond to an event 104 or a series of events 114 that deviates from the normalcy mode 106.

As another example, a fourth expected scenario 108 in the normalcy mode 106 may indicate that in response to being involved in an accident or a collision with a vehicle 122, it is expected that an individual from the vehicle 122 to approach the AV 302 within the threshold period of time 118. Thus, if the sensors 346 detect that the vehicle 122 involved in the accident is fleeing the scene of the accident, the control device 350 may determine that this situation is a deviation from the normalcy mode 106, i.e., it may be a case of "hit and run."

As another example, a fifth expected scenario 108 in the normalcy mode 106 may indicate that in response to detecting that one or more vehicles 122 exhibiting unexpected or anomalous driving behaviors, it is expected that such unexpected or anomalous driving behaviors do not persist for more than the threshold period of time 118. Some examples of unexpected or anomalous driving behaviors of the one or more vehicles 122 may comprise invading the space within the threshold distance 128 from the AV 302, making contact or collide with the AV 302, swerving in front of the AV 302, among others. Some examples of one or more vehicles 122 tampering with the AV 302 may comprise forcing the AV 302 to pull over, deviate from its routing place 152, slow down, speed up, drive over an object 124, crash, or collide with another vehicle 122. Thus, if the sensors 346 detect that any or any combination of the driving scenarios described above persists for more than the threshold period of time 118, the control device 350 may determine that this situation is a deviation of the normalcy mode 106.

Example Malicious Events

As described above, the series of events 114 generally includes events 104 that in the aggregate indicate that a third party, such as at least one vehicle 122 or an individual is tampering with the AV 302.

In one embodiment, determining that a series of events 114 in the aggregate indicates a deviation from the normalcy mode 106 may comprise detecting that each event 104 from the series of events 114 deviates from the normalcy mode 116.

In one embodiment, determining that a series of events 114 in the aggregate indicates a deviation from the normalcy mode 106 may comprise detecting that at least a threshold number 116 of events 104 (or at least a subset of the series of events 114 above the threshold number 116) within the threshold period of time 118 deviate from the normalcy mode 106.

In one embodiment, determining that a series of events 114 in the aggregate indicates a deviation from the normalcy mode 106 may comprise grouping or taking a collection of events 104 together to form the series of events 114 that, as a whole, is compared with the expected scenarios 108 to determine whether the series of events 114 deviates from the normalcy mode 106.

Various examples of such series of events 114 are illustrated in FIG. 1 and described in detail below. Some examples of the series of events 114 may be related to unexpected or abnormal behaviors of moving objects, such as vehicles 122, individuals, and/or pedestrians detected within the detection zones of the sensors 346. Some examples of the series of events 114 may be related to unexpected or abnormal behaviors of moving objects, such as vehicles 122, individuals, and/or pedestrians, where the moving objects are not within the detection zones of the sensors 346. Some examples of the series of events 114 may be related to unexpected or abnormal behaviors of static or stationary objects, such as traffic lights 126. The series of events 114 may not be zone- or region-specific, which means that the series of events 114 may occur at any region.

As illustrated in FIG. 1, the AV 302 is traveling on the road 120 according to its predetermined routing plan 152 when one or more examples of the series of events 114 occur.

As an example, a first series of events 114 may indicate that the AV 302 is forced to deviate from its predetermined routing plan 152 by one or more vehicles 122 such that the AV 302 is forced to re-route or pull over. For instance, assume that while the AV 302 is traveling along the road 120, vehicles 122a and 122b on both sides of the AV 302 drive with a distance less than the threshold distance 128 from the AV 302 for more than the threshold period of time 118. In other words, vehicles 122a and 122b invade the space within a threshold distance 128 from the AV 302 for more than the threshold period of time 118. The sensors 346 detect these invasions of the space within the threshold distance 128, and communicate sensor data 178 indicating these invasions to the control device 350. In one example, vehicles 122a and 122b may force the AV 302 to re-route from its routing plan 152 and take the exit 130. In another example, vehicles 122a and 122b may force the AV 302 to pull over to a side of the road 120 (as noted in FIG. 1 as pull over 180). Although FIG. 1 illustrates vehicles 122a and 122b on sides of the AV 302, it is understood that any number of vehicles 122 on one or more sides of the AV 302 may contribute to forcing the AV 302 to deviate from its routing plan 152 or pull over. For example, vehicle 122c may also contribute to this malicious event by impeding the AV 302 from speeding up or otherwise evading vehicles 122a and 122b and their attempt to force AV 302 from being re-routed or pulled over. In this way, one or more of vehicles 122a-c may "box in" AV 302 and force it to deviate from its routing plan 152.

As another example, a second series of events 114 may indicate that the AV 302 is forced to slow down by one or more vehicles 122 where other vehicles 122 around the AV 302 are not slowing down. For instance, assume that while the AV 302 is traveling along the road 120, first vehicle 122a (on the left side), second vehicle 122b (on the right side), and third vehicle 122c (on the front) unexpectedly slow down even though there are no traffic (i.e., vehicles 122e and 122f are not slowing down) and no traffic lights 126 detected by the sensors 346. As such, the AV 302 is forced to slow down. Although FIG. 1 illustrates vehicles 122a-c surrounding the AV 302, it is understood that any number of vehicles 122 on one or more sides of the AV 302 may contribute to forcing the AV 302 to slow down. For example, another vehicle 122 on the rear side of the AV 302 may also match (or comes close to) the speed of the vehicles 122a-c to box-in the AV 302, thus, forcing the AV 302 to slow down.

As another example, a third series of events 114 may indicate that the AV 302 is forced to slow down as detected by the control device 350 monitoring an engine 342a of the AV 302 (see FIG. 3). For instance, assume that while the AV 302 is traveling along the road 120, a fourth vehicle 122d drags the AV 302 back with a cable 182 attached to the AV 302, thus, forcing the AV 302 to slow down or otherwise impeding its movements. The control device 350 may store this event as a first event 104a that is initiated at a first timestamp 136. Also, assume that an individual from the fourth vehicle 122d or an accomplice vehicle 122 has attached the cable 182 to the AV 302 that did not trigger an event 104 that deviates from the normalcy mode 106.

In this particular example, the fourth vehicle 122d that is tampering with the AV 302 is not within the detection zone of the sensors 346. Thus, the sensors 346 may not detect the presence of the fourth vehicle 122d. However, the control device 350 that is monitoring the speed of the engine 342a (see FIG. 3) detects that the speed of the engine 342a is not within a particular speed range that is provided in the driving instructions 154, as expected. The particular speed range is determined according to the speed limit of the road 120 and other criteria, such as fuel-saving, providing a safe driving experience for the AV 302, other vehicles 122, pedestrians, among other criteria. The control device 350 may also detect that the engine 342a (see FIG. 3) and other components contributing to the speed of the AV 302 indicate that they are in normal operations. For example, the control device 350 may detect that the engine 342a (see FIG. 3) and the other components' performance indicators indicate their performance is within a normal range, e.g., 80%, and that they are not damaged. As for another example, the control device 350 may detect that the engine 342a (see FIG. 3) and the other components are not overheated (for example, their temperature is within a normal range, e.g., 35-40 degrees), do not lack fuel (for example, the fuel level is above a threshold level, e.g., 70%), do not lack electrical power (for example, a battery level indicator of a battery producing electrical power indicates that is above a threshold level, e.g., 80%), or any other conditions that may cause the AV 302 to slow down. The control device 350 may store this set of determinations (indicating that the engine 342a is in normal operation) as a second event 104b at a second timestamp 136. If these events 104a-b persists for more than the threshold period of time 118, the control device 350 determines that these events amount to the third series of events 114. Thus, for this particular example, control device 350 detects that the third series of events 114 has occurred even though no suspected vehicle 122 potentially causing the AV 302 to slow down is detected by the sensors 346. Although FIG. 1 illustrates that the fourth vehicle 122d is dragging the AV 302 back forcing the AV 302 to slow down, it is understood that the fourth vehicle 122d may be in front of the AV 302 and pull the AV 302 forward forcing the AV 302 to speed up, for example, to miss its predetermined exit 130 or to deviate from its routing plan 152.

As another example, a fourth series of events 114 may indicate one or more impacts with the AV 302 within the threshold period of time 118 by one or more vehicles 122 tampering with the AV 302. For instance, assume that while the AV 302 is traveling along the road 120, the first vehicle 122a hits or collides with the AV 302 at a first timestamp 136. The sensors 346 detect the first collision, and communicate this event (i.e., first event 104a) to the control device 350. Also, assume that the first vehicle 122a (or the second vehicle 122b) hits or collides with the AV 302 at a second timestamp 136. Similarly, the sensors 346 detect the second collision, and communicate this event (i.e., second event 104b) to the control device 350. If the control device 350 determines that the first event 104a and the second event 104b have occurred within the threshold period of time 118, the control device 350 determines that the events 104a and 104b taken in the aggregate amount to the fourth series of events 114 that deviates from the normalcy mode 106.

In another instance, assume that while the AV 302 is traveling along the road 120, an individual from the first vehicle 122a hits the AV 302 at the first timestamp 136, for example, by an object, such as a rock or a crowbar. Also, assume that an individual from the first vehicle 122a (or the second vehicle 122b) hits the AV 302 at the second timestamp 136, for example, by an object, such as a rock or a crowbar. Similar to the instance described above, if the control device 350 determines that these hits or impacts with the AV 302 are within the threshold period of time 118, the control device 350 determines that these events taken in the aggregate amount to the fourth series of events 114 that deviates from the normalcy mode 106.

As another example, a fifth series of events 114 may indicate unexpected driving behaviors form one or more vehicles 122. For instance, assume that while the AV 302 is traveling along the road 120, the first vehicle 122a unexpectedly invades the space within threshold distance 128 from the AV 302 and swerves in front of the AV 302 at a first timestamp 136. The sensors 346 detect this invasion of the space within threshold distance 128, and communicate sensor data 178 indicating this invasion to the control device 350. The control device 350 may store this event at a first event 104a. Also, assume that the first vehicle 122a slows down at a second timestamp 136, thus, forcing the AV 302 to slow down. Similarly, the sensors 346 detect that the first vehicle 122a is slowing down, and communicate corresponding sensor data 178 indicating that to the control device 350. The control device 350 may store this event as a second event 104b. If the control device 350 determines that events 104a and 104b occur within the threshold period of time 118, the control device 350 determines that the events 104a and 104b taken in the aggregate amount to the fifth series of events 114 that deviates from the normalcy mode 106.

In another instance, assume that while the AV 302 is traveling along the road 120, the first vehicle unexpectedly swerves in front of the AV 302 at a first timestamp 136. Also, assume that the second vehicle 122b unexpectedly swerves in front of the AV 302 at a second timestamp 136. Similar to the instance described above, if the control device 350 determines that the events 104a and 104b occur within the threshold period of time 118, the control device 350 determines that these events 104a-b taken in the aggregate amount to the fifth series of events 114 that deviates from the normalcy mode 106.

As another example, a sixth series of events 114 may indicate that at least one sensor 346 from the sensors 346 is non-responsive or disabled. For instance, assume that while the AV 302 is traveling along the road 120, a sensor 346 from the sensors 346 becomes non-responsive as a result of an impact. The sensor 346 may become non-responsive, for example, when the first vehicle 122a or an individual from the first vehicle 122a hits the sensor 346 in an attempt to disable or damage the sensor 346. The control device 350 analyzes sensor data 178 captured by the sensor 346 (before it became non-responsive) and determines that the sensor 346 was disabled as a result of an impact from an object, such as a rock, a crowbar, etc., or the first vehicle 122a.

In another instance, assume that a first sensor 346 becomes non-responsive at a first timestamp 136 (stored at the first event 104a); and a second sensor 346 becomes non-responsive at a second timestamp 136 (stored at the second event 104b). If the control device 350 determines that the events 104a and 104b occur within the threshold period of time 118, the control device 350 determines that the events 104a and 104b taken in the aggregate amount to the sixth series of events 114 that deviates from the normalcy mode 106.

In another instance, assume that a sensor 346 becomes non-responsive as a result of tampering. In one example, a sensor 346 may become non-responsive as a result of a cybersecurity breach in data communication between the sensor 346 and the control device 350. For example, the sensor 346 may become non-responsive at a first timestamp 136 as a result of a cybersecurity breach. The control device 350 may detect the cybersecurity breach, for example, by detecting a third-party attempt to establish unauthorized access to the sensor 346 or the control device 350.

In another instance, a sensor 346 may become non-responsive as a result of propagating jamming signals, radio waves, light beams, and the like. For example, jamming signals may be used to tamper with infrared sensors 346, jamming radio waves may be used to tamper with Radar sensors 346b (see FIG. 3), jamming light (or jamming laser) beams may be used to tamper with LiDAR sensors 346f (see FIG. 3).

The control device 350 may detect such events 104 initiated at their corresponding timestamps 136, and if they persist for more than the threshold period of time 118, the control device 350 determines that such events 104 amount to a series of events 114 that deviates from the normalcy mode 106.

As another example, a seventh series of events 114 may indicate that the AV 302 is forced to drive over an object 124 as a result of unexpected driving behaviors of one or more vehicles 122. For instance, assume that while the AV 302 is traveling along the road 120, the first vehicle 122a unexpectedly swerves in front of the AV 302 at a first timestamp 136, forcing the AV 302 to deviate from its traveling path (stored as the first event 104a), and as a result, the AV 302 drives over the object 124 at a second timestamp 136 (stored as the second event 104b). If the control device 350 determines that the events 104a and 104b occur within the threshold period of time 118, the control device 350 determines that the events 104a and 104b taken in the aggregate amount to the seventh series of events 114 that deviates from the normalcy mode 106. As for another instance, following driving over the object 124, assume that a tire of the AV 302 is blown at a third timestamp 136. The control device 350 stores this event at a third event 104c. Thus, the control device 350 determines that events 104a-c taken in the aggregate amount to a series of events 114 that deviates from the normalcy mode 106.

As another example, an eighth series of events 114 may indicate that a scheduled action indicated in a map data 150 unexpectedly does not occur. Map data 150 is described in detail further below. In brief, the map data 150 comprises detailed information about the environment on and around the traveling path of the AV 302 including objects on and around the road 120, such as location coordinates of the road signs, buildings, terrain, traffic lights 126, railroad crossing lights, among others. The map data 150 further comprises scheduling information of the traffic lights 126, scheduling information of the railroad crossing lights, and any other scheduling information that the AV 302 may encounter during its routing plan 152. For example, the map data 150 comprises timestamps 136 when the traffic light 126 indicates yellow, green, and red lights. In another example, the map data 150 comprises timestamps 136 when a railroad crossing light indicates red and green lights.

Continuing the example of the eighth series of events 114, assume that while the AV 302 is traveling along the road 120, the AV 302 reaches the traffic light 126 and stops behind the traffic light 126 that is indicating a red light. Also, assume that the map data 150 indicates that a wait time for the traffic light 126 to change from a red light to a green light is a particular duration, for example, one minute. Also, assume the sensors 346 are detecting the red light from the traffic light 126 for more than the particular duration indicated in the map data 150. The control device 350 compares the scheduling information associated with the traffic light 126 provided by the map data 150 with the sensor data 178 captured by the sensors 346. In this particular instance, the control device 350, based on the comparison between the map data 150 and the sensor data 178, determines that a scheduled action (i.e., the traffic light 126 indicating a green light after one minute) has not occurred. The control device 350 may store this event as the first event 104a initiated at a first timestamp 136. Also, assume that following the delay in changing an indication light by the traffic light 126, a vehicle 122 invades the space within threshold distance 128 from the AV 302 at a second timestamp 136. The sensors 346 detect this invasion of the threshold distance 128, and communicate sensor data 178 indicating this invasion to the control device 350. The control device 350 may store this event as the second event 104b. If the control device 350 determines that the events 104a and 104b occur within the threshold period of time 118, the control device 350 determines that the events 104a and 104b taken in the aggregate amount to the eighth series of events 114 that deviates from the normalcy mode 106.

As another example, a ninth series of events 114 may indicate that a field-of-view of at least one sensor 346 is obfuscated. For instance, assume that while the AV 302 is traveling along the road 120, an object is used to obfuscate a detection zone or a field-of-view of the sensor 346 at a first timestamp 136. In a particular example, sensor data 178 received from the sensor 346 prior to the first timestamp 136 indicate that a blanket is thrown over the sensor 346. The control device 350 determines that the sensor 346 is functional because the sensor 346 is responsive to communication with the control device 350. In other words, the control device 350 can receive sensor data 178 from the sensor 346. However, the sensor data 178 is not as expected compared to sensor data 178 received prior to the first timestamp 136. If the control device 350 determines that these events 104 (beginning from the first timestamp 136) persists for more than the threshold period of time 118, the control device 350 determines that these events 104 amount to the ninth series of events 114 that deviates from the normalcy mode 106.

In response to detecting any of the example series of events 114 described above, the control device 350 escalates the series of events 114 to be addressed. For example, the control device 350 communicates the series of events 114 to the operation server 140 to be addressed by the remote operator 164. This process is described in detail in conjunction with the operational flow of the system 100 further below. It should be understood that the previous series of events 114 described above are mere examples are not an exhaustive list of events 104 or series of events 114 that may be identified as deviating from normalcy mode 106. This disclosure contemplates any suitable number and combination of events 104 that may deviate from a normalcy mode 106 that may be identified and escalated even if not specifically described as an example herein.

Operation Server

Aspects of an embodiment of the operation server 140 are described above, and additional aspects are provided below. The operation server 140 includes at least one processor 142, at least one memory, at least one network interface 146, and at least one user interface 148. The operation server 140 may be configured as shown or in any other suitable configuration.

In one embodiment, the operation server 140 may be implemented by a cluster of computing devices that may serve to oversee the operations of the AV 302. For example, the operation server 140 may be implemented by a plurality of computing devices using distributed computing and/or cloud computing systems. In another example, the operation server 140 may be implemented by a plurality of computing devices in one or more data centers. As such, in one embodiment, the operation server 140 may include more processing power than the control device 350. The operation server 140 is in signal communication with one or more AVs 302 and their components (e.g., the control device 350). In one embodiment, the operation server 140 is configured to determine a particular routing plan 152 for the AV 302. For example, the operation server 140 may determine a particular routing plan 152 for an AV 302 that leads to reduced driving time and a safer driving experience for reaching the destination of that AV 302.

Processor 142 comprises one or more processors operably coupled to the memory 144. The processor 142 is any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor 142 may be a programmable logic device, a microcontroller, a microprocessor, or any suitable combination of the preceding. The processor 142 is communicatively coupled to and in signal communication with the memory 144, network interface 146, and user interface 148. The one or more processors are configured to process data and may be implemented in hardware or software. For example, the processor 142 may be 8-bit, 16-bit, 32-bit, 64-bit or of any other suitable architecture. The processor 142 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute software instructions 168 to implement the function disclosed herein, such as some or all of those described with respect to FIGS. 1 and 2. In some embodiments, the function described herein is implemented using logic units, FPGAs, ASICs, DSPs, or any other suitable hardware or electronic circuitry.

Memory 144 stores any of the information described above with respect to FIGS. 1 and 2 along with any other data, instructions, logic, rules, or code operable to implement the function(s) described herein when executed by processor 142. For example, the memory 144 may store normalcy mode 106, normalcy mode building engine 110, malicious event 112, series of events 114, threshold number 116, threshold period 118, threshold distance 128, confidence score 132, threshold score 134, timestamps 136, location coordinates 138, sensor data 178, map data 150, routing plan 152, driving instructions 154, traffic data 156, object detection machine learning modules 158, countermeasures 166, software instructions 168, and/or any other data/instructions. The software instructions 168 include code that when executed by the processor 142 causes the operation server 140 to perform the functions described herein, such as some or all of those described in FIGS. 1 and 2. The memory 144 comprises one or more disks, tape drives, or solid-state drives, and may be used as an over-flow data storage device, to store programs when such programs are selected for execution, and to store instructions and data that are read during program execution. The memory 144 may be volatile or non-volatile and may comprise read-only memory (ROM), random-access memory (RAM), ternary content-addressable memory (TCAM), dynamic random-access memory (DRAM), and static random-access memory (SRAM). The memory 144 may include one or more of a local database, cloud database, Network-attached storage (NAS), etc.

Network interface 146 is configured to enable wired and/or wireless communications. The network interface 146 is configured to communicate data between the control device 350 and other network devices, systems, or domain(s). For example, the network interface 146 may comprise a WIFI interface, a local area network 184 (LAN) interface, a wide area network 184 (WAN) interface, a modem, a switch, or a router. The processor 142 is configured to send and receive data using the network interface 146. The network interface 146 may be configured to use any suitable type of communication protocol.

User interfaces 148 may include one or more user interfaces that are configured to interact with users, such as the remote operator 164. For example, the user interfaces 148 may include peripherals of the operation server 140, such as monitors, keyboards, mouse, trackpads, touchpads, etc. The remote operator 164 may use the user interfaces 148 to access the memory 144 to review sensor data 178, review the series of events 114, and address the detected malicious event 112.

Normalcy mode building engine 110 may be implemented by the processor 142 executing the software instructions 168, and is generally configured to build the normalcy mode 106. In one embodiment, the normalcy mode building engine 110 may use simulated or offline driving situations to determine expected scenarios 108 (similar to those described above) and build the normalcy mode 106. In other words, the normalcy mode building engine 110 generates the normalcy mode 106 that corresponds to a pattern-of-life for the AV 302 in the context of driving.

In one embodiment, the normalcy mode building engine 110 may be implemented by machine learning neural networks, including a plurality of convolutional neural networks, and the like. In one embodiment, the normalcy mode building engine 110 may be implemented by supervised pattern learning techniques and/or unsupervised pattern learning techniques, such as Bayesian Non-Parametric Modeling, decision trees, etc.

In one embodiment, the expected scenarios 108 in the normalcy mode 106 may be determined by offline driving simulations in various road environments. In one example, a first environment where the AV 302 is in a traffic may be simulated to determine scenarios expected from the environment around the AV 302 including its surrounding vehicles 122 in this situation. In this example, expected scenarios 108 comprise detecting that surrounding vehicles 122 are stopped or slowing down, for example, by determining speed profiles, trajectory profiles, detecting that rear red lights of the surrounding vehicles 122 are turned on, and any other indication that indicates the AV 302 is in traffic.

In another example, a second environment where the AV 302 is behind the traffic light 126 may be simulated to determine expected scenarios 108 from the environment around the AV 302 including its surrounding vehicles 122 and the traffic light 126 in this situation. In this example, expected scenarios 108 comprise 1) detecting that the traffic light 126 is indicating a red light, 2) expecting that the traffic light 126 changes its status (i.e., from red light to green) based on its corresponding scheduling information provided in the map data 150, 3) detecting that surrounding vehicles 122 are stopped or slowing down, and any other indication that indicates the AV 302 is behind the traffic light 126.

In another example, a third environment where one or more vehicles 122 are driving around the AV 302 may be simulated to determine expected scenarios 108 from the environment around the AV 302 including its surrounding vehicles 122 in this situation. In this example, expected scenarios 108 comprise 1) expecting that the one or more vehicles 122 do not invade the threshold distance 128 from the AV 302, 2) expecting that the one or more vehicles 122 do not persist to drive parallel to the AV 302 for more than a threshold period 118, and 3) if the one or more vehicles 122 invade the threshold distance 128 from the AV 302, expecting that the one or more vehicles 122 do not persist this situation for more than the threshold period 118. The threshold distance 128 may vary depending on which side of the AV 302 it is being measured. For example, a threshold distance 128 from the AV 302 from sides of the AV 302 may be less than a threshold distance 128 from the AV 302 from the front and the rear.

Map data 150 may include a virtual map of a city which includes the road 120. In some examples, the map data 150 may include the map 458 and map database 436 (see FIG. 4 for descriptions of the map 458 and map database 436). The map data 150 may include drivable areas, such as roads 120, paths, highways, and undrivable areas, such as terrain (determined by the occupancy grid module 460, see FIG. 4 for descriptions of the occupancy grid module 460). The map data 150 may specify location coordinates of road signs, lanes, lane markings, lane boundaries, road boundaries, traffic lights 126, etc.

Routing plan 152 is a plan for traveling from a start location (e.g., a first AV 302 launchpad/landing pad) to a destination (e.g., a second AV 302 launchpad/landing pad). For example, the routing plan 152 may specify a combination of one or more streets/roads/highways in a specific order from the start location to the destination. The routing plan 152 may specify stages including the first stage (e.g., moving out from the start location), a plurality of intermediate stages (e.g., traveling along particular lanes of one or more particular street/road/highway), and the last stage (e.g., entering the destination. The routing plan 152 may include other information about the route from the start position to the destination, such as road/traffic signs in that routing plan 152, etc.

Driving instructions 154 may be implemented by the planning module 462 (See descriptions of the planning module 462 in FIG. 4). The driving instructions 154 may include instructions and rules to adapt the autonomous driving of the AV 302 according to the driving rules of each stage of the routing plan 152. For example, the driving instructions 154 may include instructions to stay within the speed range of a road 120 traveled by the AV 302, adapt the speed of the AV 302 with respect to observed changes by the sensors 346, such as speeds of surrounding vehicles 122, objects within the detection zones of the sensors 346, etc.

Object detection machine learning modules 158 may be implemented by the processor 142 executing software instructions 168, and is generally configured to detect objects from the sensor data 178. The object detection machine learning modules 158 may be implemented using neural networks and/or machine learning algorithms for detecting objects from any data type, such as images, videos, infrared images, point clouds, Radar data, etc.

In one embodiment, the object detection machine learning modules 158 may be implemented using machine learning algorithms, such as Support Vector Machine (SVM), Naive Bayes, Logistic Regression, k-Nearest Neighbors, Decision Trees, or the like. In one embodiment, the object detection machine learning modules 158 may utilize a plurality of neural network layers, convolutional neural network layers, and/or the like, in which weights and biases of perceptrons of these layers are optimized in the training process of the object detection machine learning modules 158. The object detection machine learning modules 158 may be trained by a training dataset which includes samples of data types labeled with one or more objects in each sample. For example, the training dataset may include sample images of objects (e.g., vehicles 122, lane markings, pedestrian, road signs, etc.) labeled with object(s) in each sample image. Similarly, the training dataset may include samples of other data types, such as videos, infrared images, point clouds, Radar data, etc. labeled with object(s) in each sample data. The object detection machine learning modules 158 may be trained, tested, and refined by the training dataset and the sensor data 178. The object detection machine learning modules 158 use the sensor data 178 (which are not labeled with objects) to increase their accuracy of predictions in detecting objects. For example, supervised and/or unsupervised machine learning algorithms may be used to validate the predictions of the object detection machine learning modules 158 in detecting objects in the sensor data 178.

Traffic data 156 may include traffic data of roads/streets/highways in the map data 150. The operation server 140 may use traffic data 156 that is captured by one or more mapping vehicles. The operation server 140 may use traffic data 156 that is captured from any source, such as crowd-sourced traffic data 156 captured from external sources, e.g., Waze and Google maps, live traffic reporting, etc.

Countermeasures 166 comprise instructions to be carried out in response to escalating the series of events 114 and determining that the series of events 114 corresponds to a malicious event 112. For example, the countermeasures 166 may comprise instructions that indicate to establish a communication path 160 with a communication module at the AV 302 in order to converse with individuals causing the series of events 114 and tampering with the AV 302. As for another example, the countermeasures 166 may comprise instructions that indicate to activate a horn of the AV 302. As for another example, the countermeasures 166 may comprise instructions that indicate to send a notifying message 172 to law enforcement 170, where the notifying message 172 comprises an indication that the AV 302 has been tampered with at particular location coordinates 138 where the series of events 114 has occurred. In one embodiment, countermeasures 166 may be performed by the remote operator 164 as described further below. In one embodiment, performing the countermeasures 166 may be computerized and performed by the operation server 140.

Application Server

The application server 162 is generally any computing device configured to communicate with other devices, such as other servers (e.g., operation server 140), AV 302, databases, etc., via the network 184. The application server 162 is configured to perform specific functions described herein and interact with the remote operator 164, e.g., via communication path 174 using its user interfaces. Examples of the application server 162 include, but are not limited to, desktop computers, laptop computers, servers, etc. In one example, the application server 162 may act as a presentation layer where remote operator 164 accesses the operation server 140. As such, the operation server 140 may send sensor data 178, the series of events 114, countermeasures 166 and/or any other data/instructions to the application server 162, e.g., via the network 184. The remote operator 164, after establishing the communication path 174 with the application server 162, may review the received data and carry out the countermeasures 166 in addressing the series of events 114. In another embodiment, the remote operator 164 can directly access the operation server 140, and after establishing the communication path 176 with the operation server 140, may carry out the countermeasures 166 in addressing the series of events 114. The remote operator 164 may be an individual who is associated with and has access to the operation server 140. For example, the remote operator 164 may be an administrator that can access and view the information regarding the AV 302, such as sensor data 178 and other information that is available on the memory 144.

Network 184 may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 184 may be configured to support any suitable type of communication protocol as would be appreciated by one of ordinary skill in the art.

Operational Flow

Detecting the Series of Events

The operational flow of the system 100 begins when the control device 350 detects a series of events 114, such as those described above or any other examples of a series of events 114 that deviates from the normalcy mode 106. For example, the control device 350 detects the series of events 114 by analyzing the sensor data 178. Upon detection of the series of events 114, the control device 350 determines whether the series of events 114 corresponds to a malicious event 112. In one embodiment, in this process, the control device 350 may compare the series of events 114 as a whole with the expected scenarios 108 stored in the normalcy mode 106 to determine whether the series of events 114, taken as a whole, deviates from the normalcy mode 106. In one embodiment, the control device 350 may compare events 104 from the series of events 104 with the expected scenarios 108 to determine whether at least a threshold number 116 of events 104 (from the series of events 114) within the threshold period of time 118 deviate from the normalcy mode 106.

In one embodiment, the control device 350 may compare each event 104 detected within the threshold period of time 118 individually with each of the expected scenarios 108 to determine whether each event 104 deviates from the normalcy mode 106. In this embodiment, one or more correspondence between each individual event 104 (from the series of events 114) and the expected scenarios 108 may be found that may result in determining that the series of events 114 deviate from the normalcy mode 106, even though a correspondence may not be found between the series of events 114, taken as a whole, (comprising the same events 104) within the threshold period of time 118 and the overall expected scenarios 108 such that the series of events 114 is considered a malicious event 112.

The control device 350 determines whether the series of events 114 corresponds to any of the expected scenarios 108. If a corresponding expected scenario 108 is found, the control device 350 determines that the series of events 114 does not correspond to a malicious event 112. If, however, the control device 350 determines that the series of events 114 does not correspond to any of the expected scenarios 108, it determines that the series of events 114 corresponds to the malicious event 112.

In one embodiment, at least one surveillance sensor 346i may be used to record the series of events 114 (in addition to or instead of other sensors 346). The surveillance sensor 346i may be hidden from sight. The surveillance sensor 346i may be any of the example sensors 346 described in FIG. 3 or any other object detection sensor 346. The surveillance sensor 346i may be positioned on the outer body and/or inside the AV 302 at any suitable position. For example, surveillance sensors 346i may be positioned in the cab of the AV 302 behind the front and/or side windows. In another example, a surveillance sensor 346i may be positioned underneath the AV 302. In one embodiment, the surveillance sensor 346i may be activated in response to detecting the series of events 114. For example, upon detection of the series of events 114, the control device 350 activates the surveillance sensors 346i to record the series of events 114.

Assigning a Confidence Score to the Series of Events

In one embodiment, upon detecting the series of events 114, the control device 350 assigns a confidence score 132 to the series of events 114, where the confidence score 132 indicates a probability that the series of events 114 corresponds to the malicious event 112. For instance, if every event 104 from the series of events 114 corresponds to a deviation from the normalcy mode 106, the control device 350 assigns a high confidence score 132 (e.g., 75%) to the detected series of events 114.

As another example, if the series of events 114 comprises a number of events 104 above the threshold number 116 detected within the threshold period of time 118, the control device 350 assigns a high confidence score 132 (e.g., 90%) to the detected series of events 114. For example, if the control device 350 detects that the first vehicle 122a swerved in front of the AV 302 at a first timestamp 136 (stored as a first event 104a), followed by detecting that the first vehicle 122a is slowing down at a second timestamp 136 (stored as a second event 104b), detecting that other surrounding vehicles 122 are not slowing down and no traffic light 126 detected by the sensors 346 (stored as a third event 104c), and this situation persists for more than the threshold period of time 118, the control device 350 assigns a high confidence score 132 (e.g., 90%) to these events 104a-c.

As another example, even if only one event 104 that corresponds to a deviation from the normalcy mode 106 is detected and persists over the threshold period of time 118, the control device 350 may assign a high confidence score 132 to the event 104. For example, if the control device 350 detects that a field-of-view of a sensor 346 is obfuscated according to sensor data 178 received from the sensor 346 prior to the detection of the obfuscation event 104, and this situation persists more than the threshold period of time 118, the control device 350 assigns a high confidence score 132 (e.g., 70%) to this event 104.

In contrast, for instance, if the control device 350 detects a first event 104a that deviates from the normalcy mode 106 at a first timestamp 136, and a second event 104b that deviates from the normalcy mode 106 at a second timestamp 136, and that the first timestamp 136 and the second timestamp 136 are not both within the threshold period of time 118, the control device 350 assigns a low confidence score 132 (e.g., 30%) to this series of events 114 comprising events 104a and 104b. For example, assume that the control device 350 detects a first unexpected driving behavior from the first vehicle 122a at a first timestamp 136 such as the first vehicle 122a unexpectedly swerves in front of the AV 302 (stored as a first event 104a); and detects a second unexpected driving behavior from the second vehicle 122b at a second timestamp 136 such as the second vehicle 122b unexpectedly swerves in front of the AV 302 (stored as a second event 104b). Also, assume that each of the first event 104a and second event 104b indicates a deviation from the normalcy mode 106; and that the first timestamp 136 and the second timestamp 136 are not within the threshold period of time 118. In such situations, the control device 350 assigns a low confidence score 132 to this series of events 114 that comprises events 104a and 104b.

Escalating the Series of Events

In response to detecting that the series of events 114 corresponds to a malicious event 112, the control device 350 escalates the series of events 114 to be addressed by communicating the series of events 114 to the operation server 140. In one embodiment, the operation server 140 may confirm (or update) the determination of the control device 350 regarding whether the series of events 114 corresponds to a malicious event 112. In one embodiment, the remote operator 164 may confirm (or update) the determination of the operation server 140 (and the control device 350) regarding whether the series of events 114 corresponds to a malicious event 112. This confirmation (or update) is used by the normalcy mode building engine 110 to further refine the normalcy mode 106.

For example, if it is determined that the series of events 114 does not correspond to a malicious event 112, the normalcy mode 106 is updated to include the series of events 114 indicating that the series of events 114 does not correspond to a malicious event 112.

In one embodiment, the normalcy mode 106 may be updated by the remote operator 164 reviewing the series of events 114. As such, a supervised machine learning technique may be leveraged in refining and updating the normalcy mode 106. For example, the normalcy mode building engine 110 may learn from the confirmations and updates by the remote operator 164 and refine or update the normalcy mode 106. The normalcy mode building engine 110 may adapt to the updated normalcy mode 106 using an unsupervised machine learning technique, for example, by adjusting weight and bias values of neural network layers of the normalcy mode building engine 110.

Addressing the Series of Events

The operation server 140 (or the remote operator 164) may take particular countermeasures 166 to address (or perhaps resolve) the series of events 114 and tampering with the AV 302. The corresponding description below describes non-limiting examples of countermeasures 166 in addressing (or perhaps resolving) the series of events 114.

In one embodiment, the remote operator 164 establishes a communication path 160 between the operation server 140 and the AV 302. In one embodiment, the communication path 160 may follow a one-way communication protocol, where data can be transmitted from the operation server 140 to the AV 302. For example, the communication path 160 may be configured to support voice-based, message-based, visual-based, and/or any other appropriate types of communication. The communication path 160 may be established between the operation server 140 and a communication module that is associated with the AV 302. The communication module may be installed at any appropriate location inside and/or on the outer body of the AV 302. For example, the communication module may be installed inside the cab of the AV 302, behind the front windows. The communication module may include one or more user interfaces including, but not limited to, a speaker, a monitor screen, and a microphone. The communication module may operably be coupled with a camera in a surveillance room where the remote operator 164 is located. As such, the remote operator 164 may configure the communication path 160 to show themselves on the monitor screen at the AV 302, such that the remote operator 164 is visible from the monitor screen to the individuals causing the series of events 114. For example, the remote operator 164 can converse with the individuals causing the series of events 114 to discourage the individuals causing the series of events 114 from tampering with the AV 302. In another embodiment, the communication path 160 may follow a two-way communication protocol, where data can be transmitted and received from both sides.

In one embodiment, a countermeasure 166 to address (or perhaps resolve) the malicious event 112 may comprise activating a horn of the AV 302. For example, the remote operator 164 may remotely activate the horn of the AV 302. In one embodiment, a countermeasure 166 to address (or perhaps resolve) the malicious event 112 may comprise notifying law enforcement 170. For example, the remote operator 164 may send a notifying message 172 indicating that the AV 302 is being tampered with at particular location coordinates 138. In one embodiment, the countermeasures 166 described above may be computerized and be carried out by the operation server 140.

Example Method for Detecting Malicious Events for Autonomous Vehicles

FIG. 2 illustrates an example flowchart of a method 200 for detecting malicious events 112 for an AV 302. Modifications, additions, or omissions may be made to method 200. Method 200 may include more, fewer, or other steps. For example, steps may be performed in parallel or in any suitable order. While at times discussed as the AV 302, operation server 140, control device 350, or components of any of thereof performing steps, any suitable system or components of the system may perform one or more steps of the method 200. For example, one or more steps of method 200 may be implemented, at least in part, in the form of software instructions 168, 380, respectively from FIGS. 1 and 3, stored on non-transitory, tangible, machine-readable media (e.g., memory 144, data storage device 390, and memory 502, respectively from FIGS. 1, 3, and 5) that when run by one or more processors (e.g., processors 142, 370, and 504, respectively from FIGS. 1, 3, and 5) may cause the one or more processors to perform steps 202-208.

Method 200 begins at step 202 where the control device 350 detects a series of events 114 within a threshold period of time 118. In one embodiment, the control device 350 may detect a series of events 114 within a threshold period of time 118, where the series of events 114 comprises events 104 above a threshold number 116. In some embodiments, the threshold number 116 may be one and in other embodiments, the threshold number 116 may be more than one depending on the circumstances. In this process, the control device 350 may detect the series of events 114 by analyzing the sensor data 178 captured by the sensors 346. The control device 350 may detect any of the example series of events 114 described in FIG. 1. The series of events 114 may correspond to a deviation from the normalcy mode 106. For example, the series of events 114 may comprise a first event 104a and a second event 104b that taken in the aggregate amount to a series of events 114 that deviates from the normalcy mode 106.

In some examples, the series of events 114 may comprise one or more events 104 that are not detected by the sensors 362, i.e., they are not within the detection zones of the sensors 362. For instance, as described in FIG. 1, vehicle 122d that drags the AV 302 back by a cable 182 may not be within the detection zone of the sensors 346. As such, the sensors 346 may not detect the presence of the vehicle 122d. However, the control device 350 may detect that the AV 302 is slowing down by monitoring the speed and performance of the engine 342a of the AV 302 (see FIG. 4).

In some examples, the series of events 114 may comprise one or more events 104 that are detected on lane(s) other than the lane traveled by the AV 302. For instance, as described in FIG. 1, vehicles 122a and 122b that invade the threshold distance 128 from the AV 302 may be in side-lanes with respect to the AV 302.

The threshold period of time 118 may be determined to be thirty seconds, one minute, two minutes, or any other appropriate duration of time. The threshold period of time 118 may vary depending on an encountered series of events 114 (and/or a number of events 104 in the series of events 114). For example, the threshold period of time 118 may increase as the number of events 104 in the series of events 114 increases. For example, if the control device 350 detects a set of vehicles 122 are surrounding the AV 302 and the set of vehicles 122 invading the space within threshold distance 128 from the AV 302, the control device 350 may determine the threshold period of time 118 to be shorter compared to another series of events 114, such as where one vehicle 122 on a side of the AV 302 is driving parallel to the AV 302.

At step 204, the control device 350 determines whether the series of events 114 corresponds to a malicious event 112.

In this process, the control device 350 may compare the series of events 114, taken as a whole, with the expected scenarios 108 stored in the normalcy mode 106. If no correspondence is found between the series of events 114, taken as a whole, and the expected scenarios 108, the control device 350 may determine that the series of events 114 corresponds to a malicious event 112, i.e., the series of events 114 is a deviation from the normalcy mode 106. If, however, a correspondence is found, the control device 350 may determine that the series of events 114 does not correspond to a malicious event 112. In one embodiment, the control device 350 may compare each event 104 (from the series of events 114) with the expected scenarios 108. If above the threshold number 116 of events 104 within the threshold period of time 118 correspond to the expected scenarios 108, the control device 350 may determine that the series of events 114 does not correspond to a malicious event 112. Otherwise, the control device 350 may determine that the series of events 114 corresponds to a malicious event 112.

In one embodiment, the control device 350 may determine whether the series of events 114 corresponds to a malicious event 112 by assigning a confidence score 132 to the series of events 114 and determining whether the assigned confidence score 132 is above the threshold score 134, similar to that described in FIG. 1.

In one embodiment, if it is determined that the series of events 114 corresponds to a malicious event 112, method 200 may proceed to step 206. If, however, it is determined that the series of events 114 does not correspond to a malicious event 112, method 200 may be terminated.

In another embodiment, if it is determined that the series of events 114 does not correspond to a malicious event 112, the control device 350 may communicate the series of events 114 to the operation server 140 so that the remote operator 164 can confirm, update, or override the determination of the control device 350.

At step 206, the control device 350 escalates the series of events 114 to be addressed. For example, the control device 350 communicates the series of events 114 to the operation server 140 to be addressed by the remote operator 164 (or the operation server 140). For example, in response to receiving the series of events 114, the remote operator 164 (or the operation server 140) may carry out particular countermeasures 166 to address the series of event 114, similar to that described in FIG. 1. Some examples of countermeasures 166 may comprise establishing a communication path 160 with the AV 302 such that individuals causing the series of events 114 can hear and/or see the remote operator 164 from a speaker and/or a monitor screen of a communication module installed in the AV 302, remotely activating a horn of the AV 302, sending a notifying message 172 to law enforcement 170 indicating that the AV 302 is being tampered with at the particular location coordinates 138.

Example AV and Its Operation

FIG. 3 shows a block diagram of an example vehicle ecosystem 300 in which autonomous driving operations can be determined. As shown in FIG. 3, the AV 302 may be a semi-trailer truck. The vehicle ecosystem 300 includes several systems and components that can generate and/or deliver one or more sources of information/data and related services to the in-vehicle control computer 350 that may be located in an AV 302. The in-vehicle control computer 350 can be in data communication with a plurality of vehicle subsystems 340, all of which can be resident in the AV 302. A vehicle subsystem interface 360 is provided to facilitate data communication between the in-vehicle control computer 350 and the plurality of vehicle subsystems 340. In some embodiments, the vehicle subsystem interface 360 can include a controller area network (CAN) controller to communicate with devices in the vehicle subsystems 340.

The AV 302 may include various vehicle subsystems that support the operation of AV 302. The vehicle subsystems may include the control device 350, a vehicle drive subsystem 342, a vehicle sensor subsystem 344, and/or a vehicle control subsystem 348. The components or devices of the vehicle drive subsystem 342, the vehicle sensor subsystem 344, and the vehicle control subsystem 348 shown in FIG. 3 are examples. The AV 302 may be configured as shown or any other configurations.

The vehicle drive subsystem 342 may include components operable to provide powered motion for the AV 302. In an example embodiment, the vehicle drive subsystem 342 may include an engine/motor 342a, wheels/tires 342b, a transmission 342c, an electrical subsystem 342d, and a power source 342e.

The vehicle sensor subsystem 344 may include a number of sensors 346 configured to sense information about an environment or condition of the AV 302. The vehicle sensor subsystem 344 may include one or more cameras 346a or image capture devices, a Radar unit 346b, one or more temperature sensors 346c, a wireless communication unit 346d (e.g., a cellular communication transceiver), an inertial measurement unit (IMU) 346e, a laser range finder/LiDAR unit 346f, a Global Positioning System (GPS) transceiver 346g, and/or a wiper control system 346h. The vehicle sensor subsystem 344 may also include sensors 346 configured to monitor internal systems of the AV 302 (e.g., an $O_2$ monitor, a fuel gauge, an engine oil temperature, etc.).

The IMU 346e may include any combination of sensors 346 (e.g., accelerometers and gyroscopes) configured to sense position and orientation changes of the AV 302 based on inertial acceleration. The GPS transceiver 346q may be any sensor configured to estimate a geographic location of the AV 302. For this purpose, the GPS transceiver 346q may include a receiver/transmitter operable to provide information regarding the position of the AV 302 with respect to the Earth. The Radar unit 346b may represent a system that utilizes radio signals to sense objects within the local environment of the AV 302. In some embodiments, in addition to sensing the objects, the Radar unit 346b may additionally be configured to sense the speed and the heading of the objects proximate to the AV 302. The laser range finder or LiDAR unit 346f may be any sensor configured to sense objects in the environment in which the AV 302 is located using lasers. The cameras 346a may include one or more devices configured to capture a plurality of images of the environment of the AV 302. The cameras 346a may be still image cameras or motion video cameras.

The vehicle control subsystem 348 may be configured to control the operation of the AV 302 and its components. Accordingly, the vehicle control subsystem 348 may include various elements such as a throttle and gear 348a, a brake unit 348b, a navigation unit 348c, a steering system 348d, and/or an autonomous control unit 348e. The throttle 348a may be configured to control, for instance, the operating speed of the engine and, in turn, control the speed of the AV 302. The gear 348a may be configured to control the gear selection of the transmission. The brake unit 348b can include any combination of mechanisms configured to decelerate the AV 302. The brake unit 348b can use friction to slow the wheels in a standard manner. The brake unit 348b may include an Anti-Lock Brake system (ABS) that can prevent the brakes from locking up when the brakes are applied. The navigation unit 348c may be any system configured to determine a driving path or route for the AV 302. The navigation 348c unit may additionally be configured to update the driving path dynamically while the AV 302 is in operation. In some embodiments, the navigation unit 348c may be configured to incorporate data from the GPS transceiver 346q and one or more predetermined maps so as to determine the driving path (e.g., along the road 120 of FIG. 1) for the AV 302. The steering system 348d may represent any combination of mechanisms that may be operable to adjust the heading of AV 302 in an autonomous mode or in a driver-controlled mode.

The autonomous control unit 348e may represent a control system configured to identify, evaluate, and avoid or otherwise negotiate potential obstacles or obstructions in the environment of the AV 302. In general, the autonomous control unit 348e may be configured to control the AV 302 for operation without a driver or to provide driver assistance in controlling the AV 302. In some embodiments, the autonomous control unit 348e may be configured to incorporate data from the GPS transceiver 346q, the Radar 346b, the LiDAR unit 346f, the cameras 346a, and/or other vehicle subsystems to determine the driving path or trajectory for the AV 302.

Many or all of the functions of the AV 302 can be controlled by the in-vehicle control computer 350. The in-vehicle control computer 350 may include at least one data processor 370 (which can include at least one microprocessor) that executes processing instructions 380 stored in a non-transitory computer-readable medium, such as the data storage device 390 or memory. The in-vehicle control computer 350 may also represent a plurality of computing devices that may serve to control individual components or subsystems of the AV 302 in a distributed fashion. In some embodiments, the data storage device 390 may contain processing instructions 380 (e.g., program logic) executable by the data processor 370 to perform various methods and/or functions of the AV 302, including those described with respect to FIGS. 1 and 2.

The data storage device 390 may contain additional instructions as well, including instructions to transmit data to, receive data from, interact with, or control one or more of the vehicle drive subsystem 342, the vehicle sensor subsystem 344, and the vehicle control subsystem 348. The in-vehicle control computer 350 can be configured to include a data processor 370 and a data storage device 390. The in-vehicle control computer 350 may control the function of the AV 302 based on inputs received from various vehicle subsystems (e.g., the vehicle drive subsystem 342, the vehicle sensor subsystem 344, and the vehicle control subsystem 348).

FIG. 4 shows an exemplary system 400 for providing precise autonomous driving operations. The system 400 includes several modules that can operate in the in-vehicle control computer 350, as described in FIG. 3. The in-vehicle control computer 350 includes a sensor fusion module 402 shown in the top left corner of FIG. 4, where the sensor fusion module 402 may perform at least four image or signal processing operations. The sensor fusion module 402 can obtain images from cameras located on an autonomous vehicle to perform image segmentation 404 to detect the presence of moving objects (e.g., other vehicles 122, pedestrians, etc.) and/or static obstacles (e.g., stop sign, speed bump, terrain, etc.) located around the autonomous vehicle. The sensor fusion module 402 can obtain LiDAR point cloud data item from LiDAR sensors 346 located on the autonomous vehicle to perform LiDAR segmentation 406 to detect the presence of objects and/or obstacles located around the autonomous vehicle.

The sensor fusion module 402 can perform instance segmentation 408 on image and/or point cloud data item to identify an outline (e.g., boxes) around the objects and/or obstacles located around the autonomous vehicle. The sensor fusion module 402 can perform temporal fusion where objects and/or obstacles from one image and/or one frame of point cloud data item are correlated with or associated with objects and/or obstacles from one or more images or frames subsequently received in time.

The sensor fusion module 402 can fuse the objects and/or obstacles from the images obtained from the camera and/or point cloud data item obtained from the LiDAR sensors 346. For example, the sensor fusion module 402 may determine based on a location of two cameras that an image from one of the cameras comprising one half of a vehicle located in front of the autonomous vehicle is the same as the vehicle located captured by another camera. The sensor fusion module 402 sends the fused object information to the interference module 446 and the fused obstacle information to the occupancy grid module 460. The in-vehicle control computer includes the occupancy grid module 460 can retrieve landmarks from a map database 458 stored in the in-vehicle control computer. The occupancy grid module 460 can determine drivable areas and/or obstacles from the fused obstacles obtained from the sensor fusion module 402 and the landmarks stored in the map database 458. For example, the occupancy grid module 460 can determine that a drivable area may include a speed bump obstacle.

Below the sensor fusion module 402, the in-vehicle control computer 350 includes a LiDAR based object detection module 412 that can perform object detection 416 based on point cloud data item obtained from the LiDAR sensors 414 located on the autonomous vehicle. The object detection 416 technique can provide a location (e.g., in 3D world coordinates) of objects from the point cloud data item. Below the LiDAR based object detection module 412, the in-vehicle control computer includes an image based object detection module 418 that can perform object detection 424 based on images obtained from cameras 420 located on the autonomous vehicle. The object detection 424 technique can employ a deep machine learning technique to provide a location (e.g., in 3D world coordinates) of objects from the image provided by the camera.

The Radar 456 on the autonomous vehicle can scan an area in front of the autonomous vehicle or an area towards which the autonomous vehicle is driven. The Radar data is sent to the sensor fusion module 402 that can use the Radar data to correlate the objects and/or obstacles detected by the Radar 456 with the objects and/or obstacles detected from both the LiDAR point cloud data item and the camera image. The Radar data is also sent to the interference module 446 that can perform data processing on the Radar data to track objects by object tracking module 448 as further described below.

The in-vehicle control computer includes an interference module 446 that receives the locations of the objects from the point cloud and the objects from the image, and the fused objects from the sensor fusion module 402. The interference module 446 also receive the Radar data with which the interference module 446 can track objects by object tracking module 448 from one point cloud data item and one image obtained at one time instance to another (or the next) point cloud data item and another image obtained at another subsequent time instance.

The interference module 446 may perform object attribute estimation 450 to estimate one or more attributes of an object detected in an image or point cloud data item. The one or more attributes of the object may include a type of object (e.g., pedestrian, car, or truck, etc.). The interference module 446 may perform behavior prediction 452 to estimate or predict motion pattern of an object detected in an image and/or a point cloud. The behavior prediction 452 can be performed to detect a location of an object in a set of images received at different points in time (e.g., sequential images) or in a set of point cloud data item received at different points in time (e.g., sequential point cloud data items). In some embodiments, the behavior prediction 452 can be performed for each image received from a camera and/or each point cloud data item received from the LiDAR sensor. In some embodiments, the interference module 446 can be performed to reduce computational load by performing behavior prediction 452 on every other or after every pre-determined number of images received from a camera or point cloud data item received from the LiDAR sensor (e.g., after every two images or after every three point cloud data items).

The behavior prediction 452 feature may determine the speed and direction of the objects that surround the autonomous vehicle from the Radar data, where the speed and direction information can be used to predict or determine motion patterns of objects. A motion pattern may comprise a predicted trajectory information of an object over a pre-determined length of time in the future after an image is received from a camera. Based on the motion pattern predicted, the interference module 446 may assign motion pattern situational tags to the objects (e.g., "located at coordinates (x,y)," "stopped," "driving at 50 mph," "speeding up" or "slowing down"). The situation tags can describe the motion pattern of the object. The interference module 446 sends the one or more object attributes (e.g., types of the objects) and motion pattern situational tags to the planning module 462. The interference module 446 may perform an environment analysis 454 using any information acquired by system 400 and any number and combination of its components.

The in-vehicle control computer includes the planning module 462 that receives the object attributes and motion pattern situational tags from the interference module 446, the drivable area and/or obstacles, and the vehicle location and pose information from the fused localization module 426 (further described below).

The planning module 462 can perform navigation planning 464 to determine a set of trajectories on which the autonomous vehicle can be driven. The set of trajectories can be determined based on the drivable area information, the one or more object attributes of objects, the motion pattern situational tags of the objects, location of the obstacles, and the drivable area information. In some embodiments, the navigation planning 464 may include determining an area next to the road 120 (see FIG. 1) where the autonomous vehicle can be safely parked in case of emergencies. The planning module 462 may include behavioral decision making 466 to determine driving actions (e.g., steering, braking, throttle) in response to determining changing conditions on the road 120 (see FIG. 1) (e.g., traffic light turned yellow, or the autonomous vehicle is in an unsafe driving condition because another vehicle drove in front of the autonomous vehicle and occupies a region within a pre-determined safe distance of the location of the autonomous vehicle). The planning module 462 performs trajectory generation 468 and selects a trajectory from the set of trajectories determined by the navigation planning operation 464. The selected trajectory information is sent by the planning module 462 to the control module 470.

The in-vehicle control computer includes a control module 470 that receives the proposed trajectory from the planning module 462 and the autonomous vehicle location and pose from the fused localization module 426. The control module 470 includes a system identifier 472. The control module 470 can perform a model based trajectory refinement 474 to refine the proposed trajectory. For example, the control module 470 can apply a filter (e.g., Kalman filter) to make the proposed trajectory data smooth and/or to minimize noise. The control module 470 may perform the robust control 476 by determining, based on the refined proposed trajectory information and current location and/or pose of the autonomous vehicle, an amount of brake pressure to apply, a steering angle, a throttle amount to control the speed of the vehicle, and/or a transmission gear. The control module 470 can send the determined brake pressure, steering angle, throttle amount, and/or transmission gear to one or more devices in the autonomous vehicle to control and facilitate precise driving operations of the autonomous vehicle.

The deep image-based object detection 424 performed by the image based object detection module 418 can also be used to detect landmarks (e.g., stop signs, speed bumps, etc.) on the road 120 (see FIG. 1). The in-vehicle control computer includes a fused localization module 426 that obtains landmarks detected from images, the landmarks obtained from a map database 436 stored on the in-vehicle control computer, the landmarks detected from the point cloud data item by the LiDAR based object detection module 412, the speed and displacement from the odometer sensor 444 and the estimated location of the autonomous vehicle from the GPS/IMU sensor 438 (i.e., GPS sensor 440 and IMU sensor 442) located on or in the autonomous vehicle. Based on this information, the fused localization module 426 can perform a localization operation 428 to determine a location of the autonomous vehicle, which can be sent to the planning module 462 and the control module 470.

The fused localization module 426 can estimate pose 430 of the autonomous vehicle based on the GPS and/or IMU sensors 438. The pose of the autonomous vehicle can be sent to the planning module 462 and the control module 470. The fused localization module 426 can also estimate status (e.g., location, possible angle of movement) of the trailer unit based on, for example, the information provided by the IMU sensor 442 (e.g., angular rate and/or linear velocity). The fused localization module 426 may also check the map content 432.

FIG. 5 shows an exemplary block diagram of an in-vehicle control computer 350 included in an autonomous AV 302. The in-vehicle control computer 350 includes at least one processor 504 and a memory 502 having instructions stored thereupon (e.g., software instructions 168 and processing instructions 380 of FIGS. 1 and 3, respectively). The instructions upon execution by the processor 504 configure the in-vehicle control computer 350 and/or the various modules of the in-vehicle control computer 350 to perform the operations described in FIGS. 1-5. The transmitter 506 transmits or sends information or data to one or more devices in the autonomous vehicle. For example, the transmitter 506 can send an instruction to one or more motors of the steering wheel to steer the autonomous vehicle. The receiver 508 receives information or data transmitted or sent by one or more devices. For example, the receiver 508 receives a status of the current speed from the odometer sensor or the current transmission gear from the transmission. The transmitter 506 and receiver 508 are also configured to communicate with a plurality of vehicle subsystems 340 and the in-vehicle control computer 350 described above in FIGS. 3 and 4.

While several embodiments have been provided in this disclosure, it should be understood that the disclosed systems and methods might be embodied in many other specific forms without departing from the spirit or scope of this disclosure. The present examples are to be considered as illustrative and not restrictive, and the intention is not to be limited to the details given herein. For example, the various elements or components may be combined or integrated into another system or certain features may be omitted, or not implemented.

In addition, techniques, systems, subsystems, and methods described and illustrated in the various embodiments as discrete or separate may be combined or integrated with other systems, modules, techniques, or methods without departing from the scope of this disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

Implementations of the disclosure can be described in view of the following clauses, the features of which can be combined in any reasonable manner.

Clause 1. A system, comprising:

an autonomous vehicle (AV) comprising at least one vehicle sensor located on the AV, wherein the AV is configured to travel along a road;

a control device associated with the AV and comprising a processor configured to:

detect, from sensor data received from the at least one vehicle sensor, a series of events within a threshold period of time, wherein:

the series of events taken in the aggregate within the threshold period of time deviates from a normalcy mode;

the normalcy mode comprises events that are expected to be encountered by the AV;

a number of events in the series of events is above a threshold number; determine whether the series of events corresponds to a malicious event; and in response to determining that the series of events corresponds to the malicious event, escalate the series of events to be addressed, wherein:

escalating the series of events comprises performing at least one countermeasure to address the series of events; and the at least one countermeasure comprises establishing a communication path between the AV and an operator such that the operator is able to converse with accomplices causing the series of events.

Clause 2. The system of Clause 1, wherein:

the series of events comprises at least one event that is not within a field-of-view of the at least one vehicle sensor; and the field-of-view of the at least one sensor corresponds to a detection zone of the at least one vehicle sensor.

Clause 3. The system of Clause 1, wherein detecting the series of events within the threshold period of time comprises detecting one or more of:

a first series of events indicating that the AV is forced to deviate from a predetermined routing plan by one or more vehicles such that the AV is forced to re-route or pullover;

a second series of events indicating that the AV is forced to slow down by one or more vehicles where other surrounding vehicles are not slowing down;

a third series of events indicating that the AV is forced to slow down as detected by monitoring a speed of an engine of the AV;

a fourth series of events indicating one or more impacts with the AV by one or more vehicles tampering with the AV;

a fifth series of events indicating unexpected driving behaviors from one or more vehicles comprising invading a threshold distance from the AV;

a sixth series of events indicating a vehicle sensor located on the AV is non-responsive as a result of an impact;

a seventh series of events indicating that the AV is forced to drive over an object on the road as a result of unexpected driving behaviors of one or more vehicles;

an eighth series of events indicating that a scheduled action indicated in a map data unexpectedly not occurred, wherein the scheduled action comprises at least one of scheduling of a traffic light and scheduling of a railroad crossing light; and a ninth series of events indicating that a field of view of the at least one vehicle sensor is obfuscated.

Clause 4. The system of Clause 1, wherein determining whether the series of events corresponds to the malicious event comprises:

comparing the series of events with the normalcy mode;

determining whether above a threshold number of events from the series of events correspond to any of the expected events; and in response to determining that the series of events does not correspond to any of the expected events, determining that the series of events corresponds to the malicious event.

Clause 5. The system of Clause 1, wherein the processor is further configured to:

assign a confidence score to the series of events, wherein the confidence score indicates a probability of the series of events corresponding to the malicious event;

determine whether the confidence score is above a threshold score; and in response to determining that the confidence score is above the threshold score, escalate the series of events to be addressed.

Clause 6. The system of Clause 5, wherein the processor is further configured to in response to determining that the confidence score is below the threshold score, update the normalcy mode to include the series of events indicating that the series of events does not correspond to the malicious event.

Clause 7. The system of Clause 1, wherein:

the system further comprises a surveillance sensor associated with the AV such that the surveillance sensor is hidden from sight;

the surveillance sensor is configured to be activated upon detecting the series of events; and the surveillance sensor is further configured to record the series of events.

Clause 8. A method, comprising:

detecting, from sensor data received from at least one vehicle sensor associated with an autonomous vehicle (AV), a series of events within a threshold period of time, wherein:

the series of events taken in the aggregate within the threshold period of time deviates from a normalcy mode;

the normalcy mode comprises events that are expected to be encountered by the AV;

a number of events in the series of events is above a threshold number; determining whether the series of events corresponds to a malicious event; and in response to determining that the series of events corresponds to the malicious event, escalating the series of events to be addressed, wherein:

escalating the series of events comprises performing at least one countermeasure to address the series of events; and the at least one countermeasure comprises establishing a communication path between the AV and an operator such that the operator is able to converse with accomplices causing the series of events.

Clause 9. The method of Clause 8, wherein determining whether the series of events corresponds to the malicious event comprises:

comparing each event from the series of events with the normalcy mode;

determining whether each event from the series of events corresponds to the normalcy mode; and in response to determining that each event from the series of events does not correspond to the normalcy mode, determining that the series of events corresponds to the malicious event.

Clause 10. The method of Clause 8, wherein determining whether the series of events corresponds to the malicious event comprises:

comparing a threshold number of events from the series of events with the normalcy mode, wherein the threshold number of events is a subset of the series of events;

determining whether the threshold number of events from the series of events in the aggregate corresponds to the normalcy mode; and in response to determining that the threshold number of events from the series of events in the aggregate corresponds to the normalcy mode, determining that the series of events corresponds to the malicious event.

Clause 11. The method of Clause 8, wherein the communication path comprises one or more of audio and visual communications.

Clause 12. The method of Clause 8, wherein escalating the series of events comprises sending a notifying message to law enforcement indicating that the AV is being tampered with at a particular location where the series of events is detected.

Clause 13. The method of Clause 8, wherein the threshold period of time is determined based at least in part upon the number of events in the series of events such that as the number of events in the series of events increases, the threshold period of time increases.

Clause 14. The method of Clause 8, wherein escalating the series of events comprises remotely activating a horn of the AV discouraging accomplices causing the series of events.

Clause 15. The method of Clause 14, further comprising in response to determining that the series of events does not correspond to the malicious event, updating the normalcy mode to include the series of events.

Clause 16. A computer program comprising executable instructions stored in a non-transitory computer-readable medium that when executed by one or more processors causes the one or more processors to:

detect, from sensor data received from at least one vehicle sensor associated with an autonomous vehicle (AV), a series of events within a threshold period of time, wherein:

the series of events taken in the aggregate within the threshold period of time deviates from a normalcy mode;

the normalcy mode comprises events that are expected to be encountered by the AV;

a number of events in the series of events is above a threshold number; determine whether the series of events corresponds to a malicious event; and in response to determining that the series of events corresponds to the malicious event, escalate the series of events to be addressed, wherein:

escalating the series of events comprises performing at least one countermeasure to resolve the series of events; and the at least one countermeasure comprises establishing a communication path between the AV and an operator such that the operator is able to converse with accomplices causing the series of events.

Clause 17. The computer program of Clause 16, wherein the events in the normalcy mode correspond to events expected from at least one of:

moving objects comprising vehicles and pedestrians; and static objects comprising road signs and traffic lights.

Clause 18. The computer program of Clause 16, wherein the at least one vehicle sensor comprises at least one of a camera, Light Detection and Ranging (LiDAR) sensor, motion sensor, and infrared sensor.

Clause 19. The computer program of Clause 16, wherein the at least one vehicle sensor comprises a sensor monitoring performance of at least one of an engine, a wheel, a tire, a transmission component, and an electrical component of the AV.

Clause 20. The computer program of Clause 16, wherein the AV is a tracker unit and is attached to a trailer.

The invention claimed is:

1. A system, comprising:

an autonomous vehicle comprising at least one vehicle sensor located on the autonomous vehicle, wherein the autonomous vehicle is configured to travel along a road;

a control device associated with the autonomous vehicle and comprising a processor configured to:

generate a normalcy mode based on simulating offline driving conditions for the autonomous vehicle in various road environments, wherein the various road environments comprise at least one of a first road environment where the autonomous vehicle is behind traffic, a second road environment where the autonomous vehicle is behind a traffic light, or a third road environment where a set of vehicles driving along a road with the autonomous vehicle;

detect, from sensor data received from the at least one vehicle sensor by applying an object detection machine learning module, a series of events within a threshold period of time, wherein:

the series of events taken in the aggregate within the threshold period of time deviates from the normalcy mode;

the normalcy mode comprises events that are expected to be encountered by the autonomous vehicle;

a number of events in the series of events is above a threshold number;

determine whether the series of events corresponds to a malicious event; and in response to determining that the series of events corresponds to the malicious event, escalate the series of events to be addressed, wherein:

escalating the series of events comprises performing at least one countermeasure to resolve the series of events; and the at least one countermeasure comprises establishing a communication path between the autonomous vehicle and an operator such that the operator is able to converse with accomplices causing the series of events using the established communication path.

2. The system of claim 1, wherein:

the series of events comprises at least one event that is not within a field-of-view of the at least one vehicle sensor; and the field-of-view of the at least one sensor corresponds to a detection zone of the at least one vehicle sensor.

3. The system of claim 1, wherein detecting the series of events within the threshold period of time comprises detecting one or more of:
- a first series of events indicating that the autonomous vehicle is forced to deviate from a predetermined routing plan by one or more vehicles such that the autonomous vehicle is forced to re-route or pullover;
- a second series of events indicating that the autonomous vehicle is forced to slow down by one or more vehicles where other surrounding vehicles are not slowing down;
- a third series of events indicating that the autonomous vehicle is forced to slow down as detected by monitoring a speed of an engine of the autonomous vehicle;
- a fourth series of events indicating one or more impacts with the autonomous vehicle by one or more vehicles tampering with the autonomous vehicle;
- a fifth series of events indicating unexpected driving behaviors from one or more vehicles comprising invading a threshold distance from the autonomous vehicle;
- a sixth series of events indicating a vehicle sensor located on the autonomous vehicle is non-responsive as a result of an impact;
- a seventh series of events indicating that the autonomous vehicle is forced to drive over an object on the road as a result of unexpected driving behaviors of one or more vehicles;
- an eighth series of events indicating that a scheduled action indicated in a map data unexpectedly not occurred, wherein the scheduled action comprises at least one of scheduling of a traffic light and scheduling of a railroad crossing light; and
- a ninth series of events indicating that a field of view of the at least one vehicle sensor is obfuscated.

4. The system of claim 1, wherein determining whether the series of events corresponds to the malicious event comprises:
- comparing the series of events with the normalcy mode;
- determining whether above a threshold number of events from the series of events correspond to any of the expected events; and
- in response to determining that the series of events does not correspond to any of the expected events, determining that the series of events corresponds to the malicious event.

5. The system of claim 1, wherein the processor is further configured to:
- assign a confidence score to the series of events, wherein the confidence score indicates a probability of the series of events corresponding to the malicious event;
- determine whether the confidence score is above a threshold score; and
- in response to determining that the confidence score is above the threshold score, escalate the series of events to be addressed.

6. The system of claim 5, wherein the processor is further configured to, in response to determining that the confidence score is below the threshold score, update the normalcy mode to include the series of events indicating that the series of events does not correspond to the malicious event.

7. The system of claim 1, wherein:
- the system further comprises a surveillance sensor associated with the autonomous vehicle such that the surveillance sensor is hidden from sight;
- the surveillance sensor is configured to be activated upon detecting the series of events; and
- the surveillance sensor is further configured to record the series of events.

8. A method, comprising:
- generating a normalcy mode based on simulating offline driving conditions for an autonomous vehicle in various road environments, wherein the various road environments comprise at least one of a first road environment where the autonomous vehicle is behind traffic, a second road environment where the autonomous vehicle is behind a traffic light, or a third road environment where a set of vehicles driving along a road with the autonomous vehicle;
- detecting, from sensor data received from at least one vehicle sensor associated with an autonomous vehicle by applying an object detection machine learning module, a series of events within a threshold period of time, wherein:
  - the series of events taken in the aggregate within the threshold period of time deviates from the normalcy mode;
  - the normalcy mode comprises events that are expected to be encountered by the autonomous vehicle;
  - a number of events in the series of events is above a threshold number;
- determining whether the series of events corresponds to a malicious event; and
- in response to determining that the series of events corresponds to the malicious event, escalating the series of events to be addressed, wherein:
  - escalating the series of events comprises performing at least one countermeasure to resolve the series of events; and
  - the at least one countermeasure comprises establishing a communication path between the autonomous vehicle and an operator such that the operator is able to converse with accomplices causing the series of events using the established communication path.

9. The method of claim 8, wherein determining whether the series of events corresponds to the malicious event comprises:
- comparing each event from the series of events with the normalcy mode;
- determining whether each event from the series of events corresponds to the normalcy mode; and
- in response to determining that each event from the series of events does not correspond to the normalcy mode, determining that the series of events corresponds to the malicious event.

10. The method of claim 8, wherein determining whether the series of events corresponds to the malicious event comprises:
- comparing a threshold number of events from the series of events with the normalcy mode, wherein the threshold number of events is a subset of the series of events;
- determining whether the threshold number of events from the series of events in the aggregate corresponds to the normalcy mode; and
- in response to determining that the threshold number of events from the series of events in the aggregate corresponds to the normalcy mode, determining that the series of events corresponds to the malicious event.

11. The method of claim 8, wherein the communication path comprises one or more of audio and visual communications.

12. The method of claim 8, wherein escalating the series of events comprises sending a notifying message to law enforcement indicating that the autonomous vehicle is being tampered with at a particular location where the series of events is detected.

13. The method of claim 8, wherein the threshold period of time is determined based at least in part upon the number of events in the series of events such that as the number of events in the series of events increases, the threshold period of time increases.

14. The method of claim 8, wherein escalating the series of events comprises remotely activating a horn of the autonomous vehicle discouraging accomplices causing the series of events.

15. The method of claim 14, further comprising in response to determining that the series of events does not correspond to the malicious event, updating the normalcy mode to include the series of events.

16. A non-transitory computer-readable medium storing instructions that when executed by one or more processors cause the one or more processors to:
 generate a normalcy mode based on simulating offline driving conditions for an autonomous vehicle in various road environments, wherein the various road environments comprise at least one of a first road environment where the autonomous vehicle is behind traffic, a second road environment where the autonomous vehicle is behind a traffic light, or a third road environment where a set of vehicles driving along a road with the autonomous vehicle;
 detect, from sensor data received from at least one vehicle sensor associated with an autonomous vehicle by applying an object detection machine learning module, a series of events within a threshold period of time, wherein:
  the series of events in the aggregate within the threshold period of time deviates from the normalcy mode;
  the normalcy mode comprises events that are expected to be encountered by the autonomous vehicle;
  a number of events in the series of events is above a threshold number;
 determine whether the series of events corresponds to a malicious event; and
 in response to determining that the series of events corresponds to the malicious event, escalate the series of events to be addressed, wherein:
  escalating the series of events comprises performing at least one countermeasure to resolve the series of events; and
  the at least one countermeasure comprises establishing a communication path between the autonomous vehicle and an operator such that the operator is able to converse with accomplices causing the series of events using the established communication path.

17. The non-transitory computer-readable medium of claim 16, wherein the events in the normalcy mode correspond to events expected from at least one of:
 moving objects comprising vehicles and pedestrians; and
 static objects comprising road signs and traffic lights.

18. The non-transitory computer-readable medium of claim 16, wherein the at least one vehicle sensor comprises at least one of a camera, Light Detection and Ranging (LiDAR) sensor, motion sensor, and infrared sensor.

19. The non-transitory computer-readable medium of claim 16, wherein the at least one vehicle sensor comprises a sensor monitoring performance of at least one of an engine, a wheel, a tire, a transmission component, and an electrical component of the autonomous vehicle.

20. The non-transitory computer-readable medium of claim 16, wherein the autonomous vehicle is a tracker unit and is attached to a trailer.

\* \* \* \* \*